(12) United States Patent
Oboukhov et al.

(10) Patent No.: US 12,315,534 B2
(45) Date of Patent: May 27, 2025

(54) MODULATION CODE AND ECC RATE OPTIMIZATION USING SYMBOL CONTEXT MUTUAL INFORMATION

(71) Applicant: Western Digital Technologies, Inc., San Jose, CA (US)

(72) Inventors: Iouri Oboukhov, Rochester, MN (US); Richard Galbraith, Rochester, MN (US); Jonas Goode, Lake Forest, CA (US); Niranjay Ravindran, Rochester, MN (US); Jihoon Park, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/531,491

(22) Filed: Dec. 6, 2023

(65) Prior Publication Data
US 2024/0265948 A1 Aug. 8, 2024

Related U.S. Application Data

(60) Provisional application No. 63/483,030, filed on Feb. 3, 2023.

(51) Int. Cl.
*G11B 19/04* (2006.01)
*G11B 19/12* (2006.01)
*G11B 20/18* (2006.01)

(52) U.S. Cl.
CPC .......... *G11B 19/048* (2013.01); *G11B 19/041* (2013.01); *G11B 19/128* (2013.01);
(Continued)

(58) Field of Classification Search
CPC ... G11B 19/041; G11B 19/048; G11B 19/128; G11B 20/1813; G11B 20/182; G11B 20/1833; G11B 2020/185
See application file for complete search history.

(56) References Cited

U.S. PATENT DOCUMENTS 5,488,617 A 1/1996 Van Driel
6,654,924 B1 11/2003 Hassner
(Continued)

OTHER PUBLICATIONS

J. Wang, T. Courtade, H. Shankar and R. D. Wesel, "Soft Information for LDPC Decoding in Flash: Mutual-Information Optimized Quantization," 2011 IEEE Global Telecommunications Conference—GLOBECOM 2011, Houston, TX, USA, pp. 1-6. 2011. (Year: 2011).*

(Continued)

*Primary Examiner* — Albert Decady
*Assistant Examiner* — Enamul M Kabir
(74) *Attorney, Agent, or Firm* — Patent Law Works LLP

(57) ABSTRACT

Example systems, data storage devices, testers, and methods for storage device configuration using symbol context mutual information are described. A data storage device may include channel circuit configuration settings for the encoding and decoding of data written to a non-volatile storage medium. The configuration settings may be determined by determining a known pattern for a sector, determining a series of symbol contexts, determining mutual information for each symbol context, and using the symbol context mutual information to determine relationships among configuration settings, such as bit size, error correction code rate, and modulation code. Once determined, the configuration settings may be used to configure the modulation code and ECC rate for the channel circuit of the data storage device.

20 Claims, 11 Drawing Sheets

(52) U.S. Cl.
CPC ........ *G11B 20/1813* (2013.01); *G11B 20/182* (2013.01); *G11B 20/1833* (2013.01); *G11B 2020/185* (2013.01)

(56) References Cited

U.S. PATENT DOCUMENTS

| | | | |
|---|---|---|---|
| 7,424,077 B2 | 9/2008 | Yang | |
| 8,291,304 B2 | 10/2012 | Yoshida | |
| 8,296,637 B1 | 10/2012 | Varnica | |
| 8,743,493 B1 | 6/2014 | Chang | |
| 8,760,780 B1 | 6/2014 | Brooker | |
| 8,786,968 B2 | 7/2014 | Qin | |
| 8,886,991 B2* | 11/2014 | Zhang | G06F 11/008 714/6.13 |
| 11,438,014 B2 | 9/2022 | Belzer | |
| 2003/0041298 A1* | 2/2003 | Bruner | G11B 20/1866 714/763 |
| 2008/0104460 A1* | 5/2008 | Kanaoka | G11B 20/18 714/E11.005 |
| 2008/0168315 A1* | 7/2008 | Mead | G01R 33/1207 714/49 |
| 2009/0094499 A1 | 4/2009 | Deoka | |
| 2009/0150748 A1 | 6/2009 | Egner | |
| 2009/0158125 A1 | 6/2009 | Harada | |
| 2010/0185906 A1 | 7/2010 | Rauschmayer | |
| 2011/0085628 A1 | 4/2011 | Kaynak | |
| 2014/0112076 A1* | 4/2014 | Ish-Shalom | G11C 16/349 365/185.18 |
| 2014/0115381 A1 | 4/2014 | Chang | |
| 2014/0359394 A1 | 12/2014 | Gasanov | |
| 2015/0100855 A1 | 4/2015 | Cai | |
| 2015/0149873 A1 | 5/2015 | Cai | |
| 2015/0236717 A1 | 8/2015 | El-Khamy | |
| 2015/0372785 A1* | 12/2015 | Visoz | H04L 1/0071 375/232 |
| 2016/0293205 A1* | 10/2016 | Jury | G11B 20/10046 |
| 2016/0321138 A1 | 11/2016 | Nakamura | |
| 2018/0358988 A1* | 12/2018 | Sharon | H03M 13/1111 |
| 2020/0142642 A1* | 5/2020 | Billa | G06F 3/0673 |
| 2020/0389188 A1 | 12/2020 | Belzer | |
| 2021/0135783 A1* | 5/2021 | Yang | H04L 1/0068 |

OTHER PUBLICATIONS

Ebada et al., "Scattered Exit Charts for Finite Length LDPC Code Design," Institute of Telecommunications, 2018, pp. 1-7.

Wu et al., "Channel Modeling, Signal Processing and Coding for Perpendicular Magnetic Recording", ProQuest Dissertations And Theses, 2009, vol. 69-12, Sec. B, pp. 7723-7860.

Shi et al., "Adaptive Minimum-Bit-Error Rate PDNP Detection for Magnetic Recording," ICC 2020—2020 IEEE International Conference on Communications (ICC), Jun. 2020, pp. 1-6.

Ryan et al., "Optimal Code Rates for the Lorentzian Channel: Shannon Codes and LDPC Codes." IEEE Transactions on Magnetics, Nov. 2004, vol. 40, No. 6, pp. 3559-3565.

Moon et al., "Pattern-dependent noise prediction in signal-dependent noise. Selected Areas in Communications", IEEE Journal on Selected Areas in Communications. vol. 19, pp. 730-743, May 1, 2001.

Wang et al., "Mutual-Information Optimized Quantization for LDPC Decoding of Accurately Modeled Flash Data", 2012.

Li et al., "A Class of High-Rate, Low-Complexity, Well-Structured LDPC Codes from Combinatorial Designs and their Applications on ISI Channels," Electrical Engineering Dept, Texas A&M University, p. 1-8.

Khittiwitchayakul et al., "Associated Sectors of Magnetic Recording Systems Using Spatially Coupled LDPC Codes" ECTI Transactions On Electrical Engineering, Electronics, And Communications vol. 20, No. 1, 2022.

Wadayama et al. "Evaluation of Symmetric Mutual Information of the Simplified TDMR Channel Model", IEEEE, p. 1-6, 2015.

* cited by examiner

MODULATION CODE AND ECC RATE OPTIMIZATION USING SYMBOL CONTEXT MUTUAL INFORMATION

TECHNICAL FIELD

The present disclosure relates to optimization of read/write channel circuits for data storage devices. In particular, the present disclosure relates to selection and configuration of data storage device components and parameters during manufacture and configuration.

BACKGROUND

Data storage devices such as hard disk drives comprise a magnetic disk and a head connected to a distal end of an actuator arm which is rotated about a pivot by a voice coil motor (VCM) to position the head radially over the disk. The disk comprises a plurality of radially spaced tracks for recording user data sectors and servo sectors. In some configurations, referred to as concentric track, the radially spaced data tracks comprise concentric rings with starting and ending positions in the same ring, sometimes including one or more parity sectors at the end of the track. In some configurations, referred to as spiral track, the radially spaced data tracks comprise at least one continuous spiral comprising multiple data tracks and multiple revolutions of the disk, with track starting and ending positions at selected points along the spiral. The servo sectors comprise head positioning information (e.g., a track address) which is read by the head and processed by a servo control system to control the actuator arm as it seeks from track to track. The magnetic disk acts as a non-volatile storage medium for storing data.

FIG. 1 shows a prior art disk format 2 as comprising a number of servo tracks 4 defined by servo sectors $6_0$-$6_N$ recorded around the circumference of each servo track. In some configurations, each servo sector comprises a preamble for storing a periodic pattern, which allows proper gain adjustment and timing synchronization of the read signal, and a sync mark for storing a special pattern used to symbol synchronize to a servo data field. The servo data field stores coarse head positioning information, such as a servo track address, used to position the head over a target data track during a seek operation. Each servo sector $6_1$ further comprises groups of servo bursts (e.g., N and Q servo bursts), which are recorded with a predetermined phase relative to one another and relative to the servo track centerlines. The phase-based servo bursts provide fine head position information used for centerline tracking while accessing a data track during write/read operations.

FIG. 2 shows a prior art mechanical configuration for a hard disk drive (HDD) 200 comprising a spindle 202 that holds a plurality of platters 204. Each platter 204 has at least one magnetic surface 206, such as a magnetic surface formatted similarly to disk format 2 in FIG. 1. Magnetic surface 206 may be configured to have digitally encoded data stored thereon as magnetized domains. A head 208 may be mounted at the end of an arm 210 controlled by an actuator 212. A read element 214 may be configured to detect magnetized portions of magnetic surface 206 and generate an analog read signal. A write element 216 may be configured to generate a timed write field to write (or erase) magnetized portions of magnetic surface 206 using an analog write signal. In some configurations, head 208 may include more than one read element 214 and/or write element 216 and HDD 200 may include multiple heads 208, arms 210, and/or actuators 212. A preamplifier (preamp or preamplifier circuit) 218 controls the read and write signals to the corresponding read and write elements (e.g., read element 214 and write element 216) of each head (e.g., head 208). Preamplifier 218 may be attached to a flex circuit 220 that provides a data and power bus connection to a printed circuit board (not shown) with other drive control circuitry, such as a disk drive controller, through a flex interface connector 222.

The disk drive controller may include a read/write channel configured to receive an analog read signal from read element 214 through preamplifier 218 and flex circuit 220. The channel may convert the analog read signal to a digital read signal and perform iterative data detection and decoding to recover the data previously stored to disk surface 206. In some configurations, the channel may be configured to perform data detection and decoding on a plurality of data sectors corresponding to a data track. Each data sector may include one or more codewords for error correction code (ECC) encoding and decoding. The configuration of heads, media, sectors, tracks, bit densities, modulation codes, ECC codes, and other features may impact the capacity and reliability of the data storage device and may be configured and optimized for both a population of drives (e.g., drive model) and the unique head/media/electronics characteristics of individual drives.

A primary metric used for optimization of the read/write channel in a particular drive has been bit error rate (BER), such as the bit error rate of a soft output Viterbi algorithm (SOVA) detector. One disadvantage of BER is that it should be recalibrated for any new conditions, such as ECC code rate changes, linear density, etc. Mutual information is a known metric in information theory, but may have reduced accuracy in systems with inter-symbol interference (ISI), such as magnetic recording.

There is a need for technology that improves data storage device configuration and optimization without relying on bit error rate.

SUMMARY

Various aspects for data storage device configuration using mutual information metrics that compensate for inter-symbol interference are described, particularly configuration of modulation codes and ECC rates for channel circuits using symbol contexts.

One general aspect includes a system that includes at least one memory and at least one processor configured to: determine a known pattern for a data frame; determine a series of symbol contexts may include different bit sequences for a selected multi-bit symbol length; determine a mutual information value for each symbol context in the series of symbol contexts; determine, based on variations in the mutual information values for the series of symbol contexts in the data frame, a set of configuration settings for a channel circuit of a data storage device; and store the set of configuration settings to the data storage device for use in operating the channel circuit.

Implementations may include one or more of the following features. The data frame may be a codeword for encoding and decoding data stored to the data storage device using the channel circuit; and determining the set of configuration settings may include averaging the mutual information values for the series of symbol contexts in the codeword to evaluate use of the codeword in the set of configuration settings. The at least one processor may be further configured to determine the set of configuration settings by: determining a range of bit sizes corresponding to a combination of bits per inch and tracks per inch on a non-volatile storage medium of the data storage device; and determining the mutual information values for the series of symbol contexts on the data frame for a plurality of bit sizes in the range of bit sizes. The at least one processor may be further configured to determine the set of configuration settings by: determining, based on the mutual information values for the series of symbol contexts and unmodulated data, first average mutual information values by bit size for the range of bit sizes; determining, based on the mutual information values for the series of symbol contexts and optimally modulated data, second average mutual information values by bit size for the range of bit sizes; and determining, based on comparing the first average mutual information values and the second average mutual information values, a selected bit size from the range of bit sizes, where a bit per inch value and a track per inch value corresponding to the selected bit size are in the set of configuration settings. The selected bit size and a corresponding mutual information value may determine a target mutual information value for determining an error correction code rate and a modulation code; the at least one processor may be further configured to determine the set of configuration settings by determining, based on the target mutual information value, a selected error correction code rate, and determining, based on the target mutual information value and the selected error correction code rate, a selected modulation code; and the selected error correction code rate and the selected modulation code may be in the set of configurations settings. The at least one processor may be further configured to determine the set of configuration settings by: determining mutual information for bits across the data frame; determining a mutual information dependency between error correction codes and modulation codes for the data frame based on mutual information for a number of bits having negative mutual information, a number of bits having at least zero mutual information, a number of ECC redundancy bits for a candidate error correction code; and a number of modulation code redundancy bits for a candidate modulation code; determining a selected error correction code rate; and determining, based on the selected error correction code and the mutual information dependency between error correction codes and modulation codes, a selected modulation code, where the selected error correction code rate and the selected modulation code are in the set of configurations settings. The at least one processor may be further configured to determine the set of configuration settings by: determining at least one candidate modulation code; dividing a codeword for the at least one modulation code into multi-bit symbols; determining the mutual information values for symbol contexts corresponding to the multi-bit symbols of the codeword; determining an average mutual information value for the data frame based on the mutual information values for the codeword; and determining, based on average mutual information values for the at least one modulation code and no modulation code, a selected modulation code from the at least one modulation code, where the selected modulation code is in the set of configuration settings. The at least one modulation code may include a plurality of modulation codes; determining the selected modulation code may include comparing average mutual information values for each modulation code of the plurality of modulation codes and an average mutual information value for no modulation code; if the mutual information value for at least one symbol context is negative, the selected modulation code may eliminate the at the least one symbol context; and if the mutual information value for each symbol context is at least zero, the selected modulation code may be no modulation code. The system may include a tester that includes the at least one memory, the at least one processor, and a storage device interface configured to communicate with the data storage device to: write the known data to the data frame on a non-volatile storage medium of the data storage device; read the known data from the data frame on the non-volatile storage medium; and store the set of configuration settings to the data storage device for use in operating the channel circuit. The system may include the data storage device that includes: the at least one memory; the at least one processor; a non-volatile storage medium configured to store user data; and the channel circuit configured to encode user data and decode user data from the non-volatile storage medium using the set of configuration settings.

Another general aspect includes a method that includes: determining a known pattern for a data frame written to a non-volatile storage medium of a data storage device; determining a series of symbol contexts may include different bit sequences for a selected multi-bit symbol length; determining a mutual information value for each symbol context in the series of symbol contexts; and determining, based on the mutual information values for the series of symbol contexts in the data frame, a set of configuration settings for a channel circuit of a data storage device; and storing the set of configuration settings to the data storage device for use in operating the channel circuit.

Implementations may include one or more of the following features. The data frame may be a codeword for encoding and decoding data stored to the data storage device using the channel circuit; and determining the set of configuration settings may include averaging the mutual information values for the series of symbol contexts in the codeword to evaluate use of the codeword in the set of configuration settings. Determining the set of configuration settings may further include: determining a range of bit sizes corresponding to a combination of bits per inch and tracks per inch on a non-volatile storage medium of the data storage device; and determining the mutual information values for the series of symbol contexts on the data frame for a plurality of bit sizes in the range of bit sizes. Determining the set of configuration settings may further include: determining, based on the mutual information values for the series of symbol contexts and unmodulated data, first average mutual information values by bit size for the range of bit sizes; determining, based on the mutual information values for the series of symbol contexts and optimally modulated data, second average mutual information values by bit size for the range of bit sizes; and determining, based on comparing the first average mutual information values and the second average mutual information values, a selected bit size from the range of bit sizes, where a bit per inch value and a track per inch value corresponding to the selected bit size may be in the set of configuration settings. The selected bit size and a corresponding mutual information value may determine a target mutual information value for determining an error correction code rate and a modulation code; determining the set of configuration settings may further include determining, based on the target mutual information value, a selected error correction code rate, and determining, based on the target mutual information value and the selected error correction code rate, a selected modulation code; and the selected error correction code rate and the selected modulation code may be in the set of configurations settings. Determining the set of configuration settings may further include: determining mutual information for bits across the data frame; determining a mutual information dependency between error correction codes and modulation codes for the data frame based on mutual information for a number of bits having negative mutual information, a number of bits having at least zero mutual information, a number of ECC redundancy bits for a candidate error correction code, and a number of modulation code redundancy bits for a candidate modulation code; determining a selected error correction code rate; and determining, based on the selected error correction code and the mutual information dependency between error correction codes and modulation codes, a selected modulation code, where the selected error correction code rate and the selected modulation code may be in the set of configurations settings. Determining the set of configuration settings may further may: determining at least one candidate modulation code; dividing a codeword for the at least one modulation code into multi-bit symbols; determining the mutual information values for symbol contexts corresponding to the multi-bit symbols of the codeword; determining an average mutual information value for the data frame based on the mutual information values for the codeword; and determining, based on average mutual information values for the at least one modulation code and no modulation code, a selected modulation code from the at least one modulation code, where the selected modulation code may be in the set of configuration settings. The at least one modulation code may include a plurality of modulation codes; determining the selected modulation code may include comparing average mutual information values for each modulation code of the plurality of modulation codes and an average mutual information value for no modulation code; if the mutual information value for at least one symbol context is negative, the selected modulation code may eliminate the at the least one symbol context; and if the mutual information value for each symbol context is at least zero, the selected modulation code may be no modulation code. The method may include, prior to determining the set of configuration settings: writing the known data to the data frame on the non-volatile storage medium of the data storage device; and reading the known data from the data frame on the non-volatile storage medium.

Still another general aspect includes a system that includes: at least one processor; at least one memory; means for determining a known pattern for a data frame written to a non-volatile storage medium of a data storage device; means for determining a series of symbol contexts may include different bit sequences for a selected multi-bit symbol length; means for determining a mutual information value for each symbol context in the series of symbol contexts; and means for determining, based on the mutual information values for the series of symbol contexts in the data frame, a set of configuration settings for a channel circuit of a data storage device; and means for storing the set of configuration settings to the data storage device for use in operating the channel circuit.

The present disclosure describes various aspects of innovative technology capable of improving data storage device capacity and reliability by optimizing configuration settings for the heads, media, and channel electronics in the data storage device. The various embodiments include operations, control circuitry, and/or tester systems to overcome or at least reduce issues previously encountered in data storage devices and, accordingly, are more efficient, reliable, and/or higher performance than other data storage devices. That is, the various embodiments disclosed herein include hardware and/or software with functionality to improve data storage device performance, such as by using configuration settings in the channel circuit determined using mutual information metrics calculated for multi-bit symbols that compensate for inter-symbol interference. Accordingly, the embodiments disclosed herein provide various improvements to data storage devices and computing systems incorporating such data storage devices.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

Figure 1:
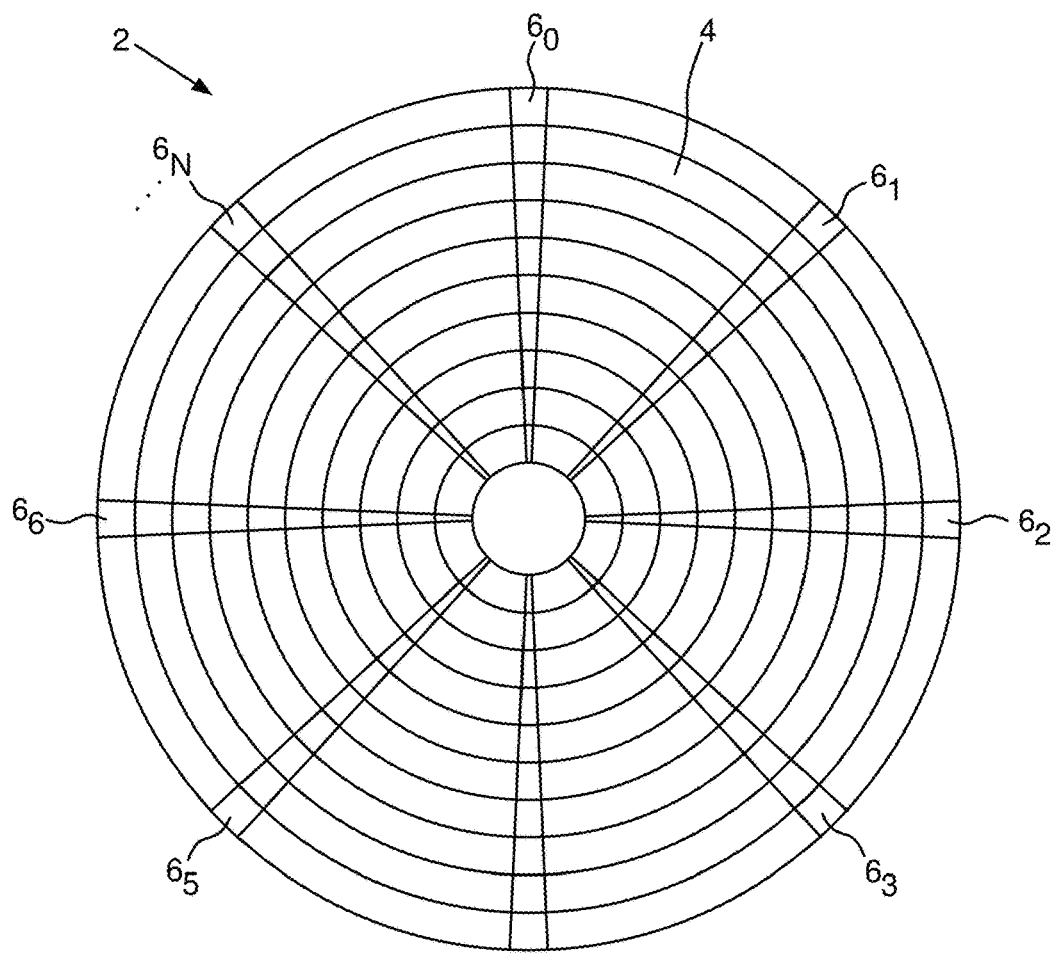
FIG. 1 is a diagram of a prior art disk format comprising a plurality of servo tracks defined by servo sectors.

Mutual information (MI) may provide a new metric for channel optimization. Mutual information is a specific computation in information theory. For each symbol of data stored and then retrieved, MI can have a value from $-\infty$ to $+1$. Positive values ($0<=MI<=1$) indicate that the symbol caries from no information (MI=0) up to the ideal true amount of information (MI=1). Negative values (MI<0) indicate that the symbol carries false information which can be very large. For example, MI=−10 would indicate that the symbol carries −10 symbols of false information (causing errors in other symbols). In hard disk drives (HDD), large negative MI values may be referred to as hard bits.

Mutual information may be dependent on linear density due to the effects of inter-symbol interference (ISI). In order to develop an independent mutual information metric that may be applied to optimizing various components of the channel circuit and corresponding configuration settings, a context-dependent mutual information metric based on a multi-bit symbol size that compensates for ISI may be determined. A multi-bit symbol size of sufficient length may be selected to limit the impact of ISI for a range of linear densities for a given data storage device. For example, a multi-bit symbol size of 4, 5, or more bits may result in a sufficient number of states (16, 32, etc.) to prevent ISI from being a significant factor in the mutual information calculation. Once an independent mutual information metric is determined, it may be used for optimizing a variety of configuration parameters (e.g., tracks-per-inch (TPI), bits-per-inch (BPI), modulation code, error correction code (ECC), etc.), predicting reliability (e.g., sector failure rates), and characterizing heads and media.

The primary definition of mutual information (I) is the log 2 of all possible messages which can be sent by n bits, as represented by:

$$I = \log_2(2^n) = n$$

However, information may include noise that results in less than 100% confidence in a transmitted bit value (1 or 0). Noise may be represented in calculating mutual information by:

$$I = \log_2((p2)^n) = n(1 + \log_2 p)$$

In the foregoing equation, p is the probability or confidence that the bit has a specific value and may be considered the binary mutual information for a single bit. An error correction code, such as a low density parity check (LDPC) code, may be used to encode a signal based on a code rate R, which may be represented as:

$$I = \log_2(2^{n \cdot R}) = n \cdot R$$

We transmit encoded bits and some bits are redundancy bits, so the information transmitted will be n*R. In order to successfully decode the encoded message, the information received should be larger than the capability of the ECC defined by R, as represented by:

$$R <= 1 + \log_2(p)$$

This formulation of the Shannon theorem demonstrates the relationship between mutual information and ECC (decoder) code rate. From this point we will refer to MI=I=1+$\log_2$(p), as per bit value, skipping number of bit n.

If R=MI, it may be considered a perfect decoder. The ECC codes and decoders used in hard disk drives (HDD) may approach the Shannon limit. Therefore, an MI value may accurately predict whether a sector with that MI will be decoded by an ECC decoder with code rate R. MI also directly correlates to areal density and improvements in MI by 1% (e.g., from 0.89 to 0.90) result in a corresponding increase in areal density of 1%. This correlation may be based on the concept that, in a first case, R for the ECC code must be at least 0.89 and, for the second case, R is increased to 0.90 and results in an areal density capability gain on fewer ECC redundancy bits.

MI is calculated per symbol, with the base equations relating to a 1-bit binary value having 2 possible states. For example, information per bit may be represented as:

$$I_2 = \log_2(p_2 2)$$

This may be generalized to any k-bit symbol by:

$$I_{2^k} = \log_{2^k}(p_2^k 2^k) = \log_M\left(p_2^{\log_2 M} M\right)$$

where M=$2^k$. It may be assumed that bits are independent inside the k-bit symbol, so that the separate confidence values for each bit may be multiplied to compute the confidence of the k-bit symbol. Additional identity transformations may show that MI for the k-bit symbol is the same as binary MI, assuming independent bits, as follows:

$$I_M = \log_2 M \cdot \log_M p_2 + 1 = \log_2 M \cdot \frac{\log_2 p_2}{\log_2 M} + 1 = \log_2 p_2 + 1 = I_2$$

However, because of inter-symbol interference, each bit may be not entirely independent and individual bit information may be spread to nearest neighbor bits. When measuring and comparing binary MI and k-bit symbol MI in systems with ISI, such as magnetic recording, the k-bit symbol MI is higher than binary MI. Experimental measurement may show that k-bit symbol MI is more accurate, because the leak of information to nearest neighbors may be less.

In the bit detection process of a channel circuit, a cost vector L can be generated where each element of the vector represents the cost incurred for representing the data as that element value. Costs may be thought of as the square error in a noise whitened signal scaled by a variance. The cost vector can be produced before the soft information detector trellis to represent branch costs or produced after the soft information detector trellis to represent sequence costs. For example, the soft information detector in the ECC decoder circuit may include a soft output Viterbi algorithm (SOVA) detector that uses a SOVA trellis to calculate log likelihood ratio (LLR) values for each state in a symbol. MI may be calculated from the LLR values and knowledge of the correct data pattern and may be calculated for various symbol sizes. For example, various symbol sizes can be used—from 1 bit symbols (2-ary MI) to 5 bit symbols (32-ary MI) may by typical, but larger symbol sizes may be preferable for addressing ISI. MI (I) based on LLR (L) may be represented by:

$$I(L) = \frac{1}{N}\sum_1^N\left(1 + \log_M \frac{e^{L_k}}{\sum_M e^{L_i}}\right)$$

Where, $L_k$ is the LLR for correct symbol state, Li is the detected LLR for the symbol state, M is the number of states in the symbol, and N is the number of averaged symbols. MI I(L) may by averaged on a codeword or another set of symbols. This equation and variations thereon may be used to calculate mutual information based on detected LLR values versus known LLR values for M-ary state symbols using the channel circuit and in a variety of optimization, failure rate predictions, and characterization contexts. For accurate MI metrics in a system with ISI, M (and its corresponding multi-bit symbol size) should be selected to meet or exceed an ISI threshold value for the heads, media, channel circuit, and range of configurations being evaluated and configured.

Figure 2:
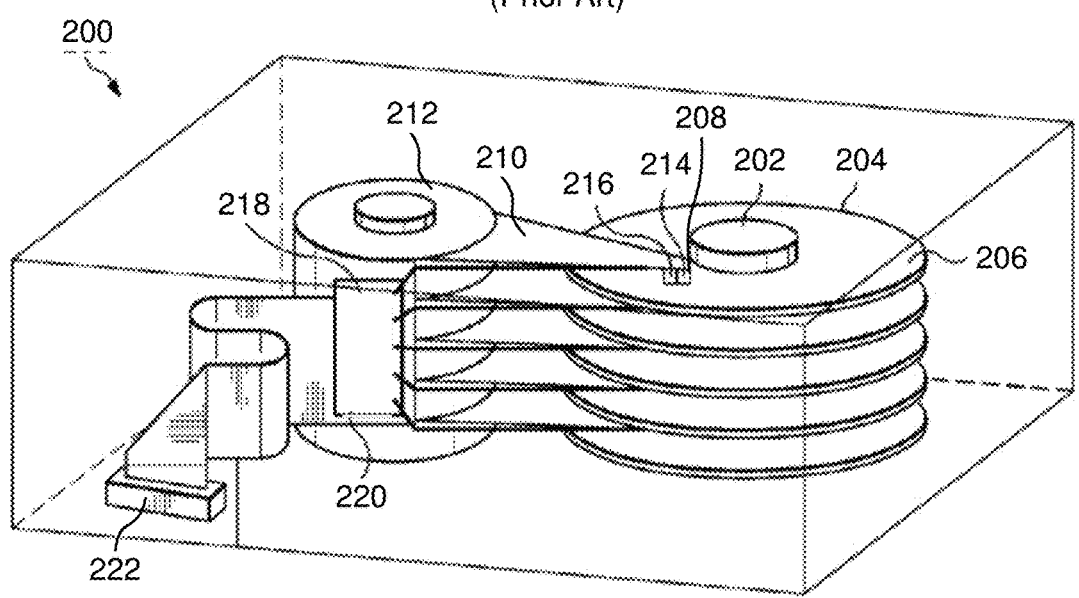
FIG. 2 is a diagram of an example data storage device in the form of a disk drive comprising heads actuated over disk surfaces.
Figure 3:
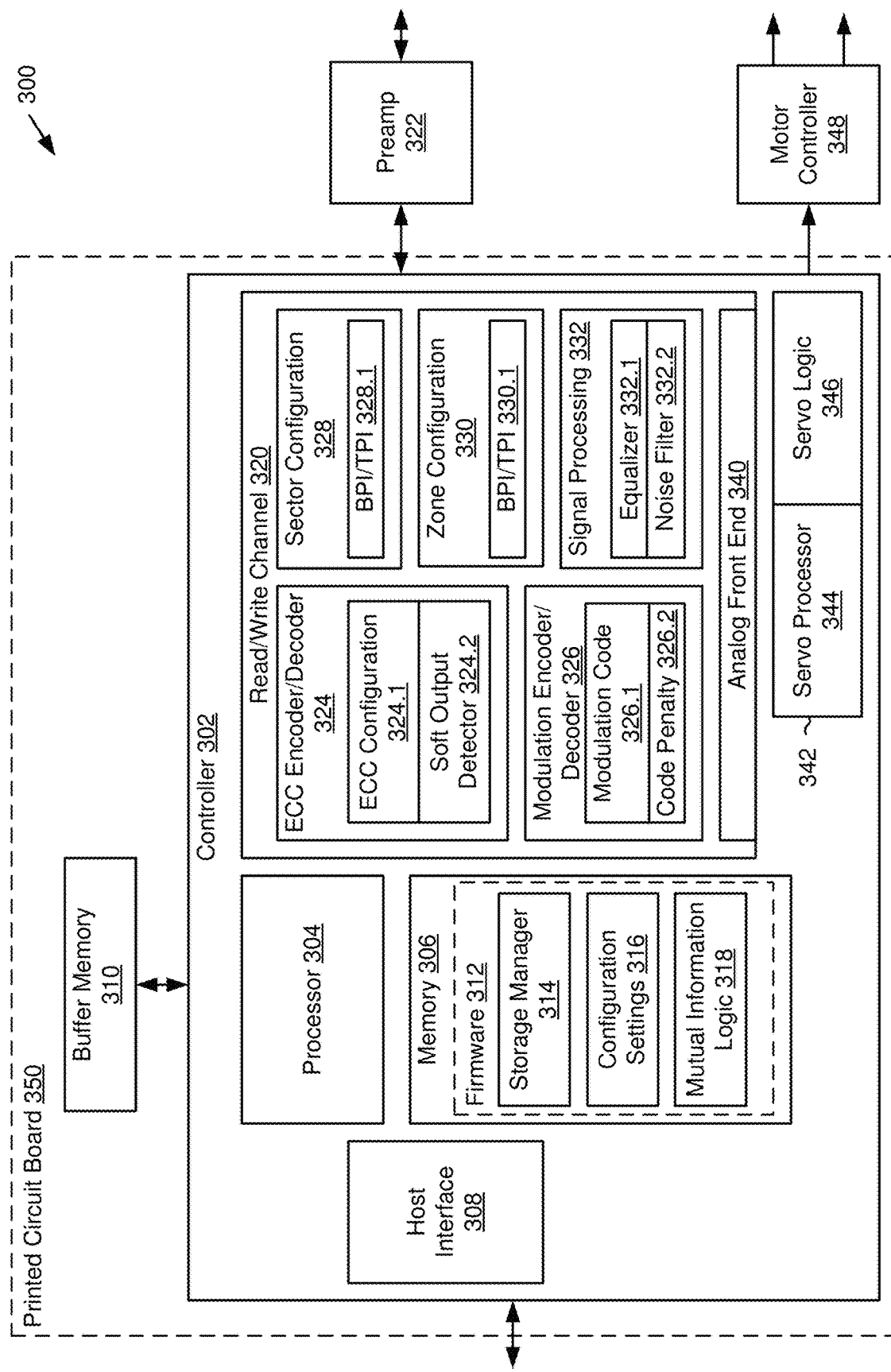
FIG. 3 is a block diagram of a configuration of data storage device electronics for a controller and read/write channel configured using mutual information metrics.

FIG. 3 shows a portion of example control circuitry 300 for a data storage device, such as a hard disk drive (HDD). In the example shown, control circuitry 300 may include one or more controllers. Controller 302 may comprise a storage device controller configured to receive host storage commands, process storage operations for writing, reading, and managing data stored to non-volatile storage media in the disk drive, such as the magnetic media disks in FIGS. 1 and 2. In some embodiments, controller 302 may correspond to a separate host interface and read/write path to a subset of disk surfaces in a data storage device with multiple controllers. In some embodiments, controller 302 may be configured to manage servo and read/write operations for one or more actuators, heads, and corresponding writer and reader elements.

Controller 302 may comprise a processor 304, a memory 306, a host interface 308, and access to a buffer memory 310. Controllers 302 may also comprise a read/write channel 320, and a servo controller 342 including a servo processor 344 and servo logic 346. In some embodiments, one or more of host interface 308, read/write channel 320, and servo controller 342 may be embodied in separate packages, such as application specific integrated circuits (ASICs), systems on a chip (SOCs), or other specialized circuits that interface with processor 304 and memory 306 for carrying out their respective functions. For example, read/write channel 320 may be configured in a channel circuit electrically connected to the other components of controller 302. Controller 302 may include physical and electrical interfaces for connecting to buffer memory 310, a power source (not shown), preamp 322, motor controller 348, other controllers, and/or other circuitry components. In some embodiments, the components of controller 302 may be interconnected by a bus that includes one or more conductors that permit communication among the components. For example, processor 304, memory 306, host interface 308, read/write channel 320, and/or servo controller 342 may be components attached to a printed circuit board assembly (PCBA) 350 that provides one or more layers of interconnect conductors among the components.

Processor 304 may include any type of conventional processor or microprocessor that interprets and executes instructions. Memory 306 may include a random access memory (RAM) or another type of dynamic storage device that stores information and instructions for execution by processor 304 and/or a read only memory (ROM) or another type of static storage device that stores static information and instructions for use by processor 304 and/or any suitable storage element, such as a system portion of a hard disk media or a solid state storage element. Memory 306 may be configured to store controller firmware 312, comprising instructions that include one or more modules or submodules for specific data storage device operations and processor 304 may execute those instructions, including controlling communication with other components, such as host interface 308, buffer memory 310, read/write channel 320, and servo controller 342.

Controller firmware 312 may include a storage manager 314 configured to receive host storage commands through host interface 308 and determine storage operations to be executed by controller 302 using read/write channel 320 and servo controller 342. For example, storage manager 314 may process read, write, delete, and similar commands targeting host data to be written to or read from the storage medium of the data storage device. Processing a read operation may include causing servo controller 342 to position the read heads over a desired track on the storage medium, applying a read voltage to the read head through preamp 322, receiving the read data in read/write channel 320, and decoding, using read/write channel 320, the read data from the read head into decoded bit data returned to storage manager 314 (and/or buffer memory 310).

In some configurations, controller firmware 312 may include configuration settings 316 based on how the electronics, particularly read/write channel 320 and servo controller 342, have been configured for a specific population (drive model) and individual device settings for the specific combination of heads, media, and electronics in that data storage device. For example, configuration settings 316 may be optimized for the physical, magnetic, and electrical characteristics of each combination of a head and media surface and the performance of the various electrical components in the read/write and servo paths. Individual drives may be configured during the manufacturing and configuration process to meet performance specifications (e.g., storage capacity and storage operations per unit time) defined for a particular drive model. In some configurations, configuration settings 316 may include a variety of parameters for controlling the operation of one or more subsystems or components, such as ECC encoder/decoder 324, modulation encoder/decoder 326, signal processing 332, and servo controller 342. For example, configuration settings 316 may include various setting types, such as ECC settings, modulation code settings, data format settings, signal processing settings, servo format settings, etc. In some configurations, configuration settings 316 may include data format settings that include track-per-inch (TPI) parameters and bit-per-inch (BPI) parameters. For example, TPI parameters may define track density for each physical zone of the storage medium (per head and media surface combination), which may include track width, track squeeze, and track overlap for shingled data formats. BPI parameters may define a bit density per track for zones, sectors, and/or other groupings of bits, which may include variable data frequency settings. Other configuration settings may be discussed with regard to specific components below.

In some configurations, configuration settings 316 may be stored in one or more configuration pages or similar data structures stored in a non-volatile memory, such as reserved locations on the storage medium or in another memory device. In some configurations, configuration settings 316 may be stored in different storage locations based on setting type, such as dedicated configuration pages and/or parameter memory locations within a particular system component. For example, read/write channel 320 may include storage locations for ECC configuration 324.1 and modulation code 326.1; servo controller 342 may include storage locations for servo sector formats and parameters; and data format settings may be stored in one or more of firmware 312, read/write channel 320, and servo controller 342.

In some configurations, controller firmware 312 may include mutual information logic 318. For example, mutual information logic 318 may include interfaces, functions, data structures, and parameter for determining mutual information metrics and thresholds for determining various configuration settings 316, updating those configuration settings, and/or determining performance or failure prediction metrics. In some configurations, some or all of the functions of tester 450 in FIG. 4 may be selectively implemented in controller firmware 312. For example, calculation of mutual information metrics may be performed by controller firmware 312 during drive optimization and/or throughout the operating live of the data storage device to set or update configuration settings 316. A more detailed description of mutual information calculation and related operations may be provided with regard to tester 450 and is not repeated here. In some configurations, equivalent firmware implementations of those tester features may be implemented in controller firmware 312.

Host interface 308 may include any transceiver-like mechanism that enables the data storage device to communicate with other devices and/or systems, such as a host system for which the storage device provides data storage. Host interface 308 may comprise a host storage interface compliant with one or more storage interface standards, such as a Serial Advanced Technology Attachment (SATA) interface, a Small Computer System Interface (SCSI), serial attached SCSI (SAS), peripheral computer interface express (PCIe) (e.g., Non-Volatile Memory Express (NVMe)), etc., for connecting host interface 308 to a peripheral interface or network port. Host interface 308 may be configured to receive host data units for storage to the non-volatile storage medium and return host data units from the non-volatile storage medium.

Buffer memory 310 may include a RAM, flash, or another type of dynamic storage device for storing host data and other information in transit between the storage media of the storage device and the host (via host interface 308). In some embodiments, buffer memory 310 is a separate memory device from memory 306 and the disk surfaces or other non-volatile memory of the data storage device.

Read/write channel 320 may include one or more specialized circuits configured for processing binary data to be written to the disk surfaces using an analog write signal and processing the analog read signal from the disk surfaces back into binary data. For example, read/write channel 320 may include a write path comprised of various data scramblers, run-length limited (RLL) encoders, iterative error correction code (ECC) encoders, precompensation circuits, and other data or signal processing components. Read/write channel 320 may include a read path comprised of various amplifiers, filters, equalizers, analog-to-digital converters (ADCs), soft information detectors, iterative ECC decoders, and other data or signal processing components. The write channel components may comprise a write channel circuit and the read channel components may comprise a read channel circuit, though the circuits may share some components and be referred to collectively as a channel circuit. Read/write channel 320 may provide the analog write signal to and receive the analog read signal from preamp 322, which controls and amplifies signals to and from the heads. Binary data for recording to the storage medium may be received by read/write channel 320 from controller firmware 312 and decoded data from read/write channel 320 may be passed to controller firmware 312 and/or directed to buffer memory 310 for communication to the host. In some embodiments, read/write channel 320 may include an analog front end 340 configured to receive the analog read signal from preamp 322 and convert it into a digital read signal for processing by other components of read/write channel 320. For example, analog front end 340 may include an analog-digital converter (ADC), timing circuit, and one or more filters, equalizers, and/or other signal conditioning components for generating the digital read data. In some configurations, signal processing components 332 may include a combination of hardware and software components that may be included in analog front end 340 and/or receive and process a digital read signal from analog front end 340.

Read write channel 320 may include an ECC encoder/decoder 324 configured to encode write data for storage to the storage medium and decode read data from the storage medium. For example, the ECC encoder may receive user data and encode it based on codewords for an ECC configuration, such as an LDPC code configuration, that includes a combination of user data and parity data. The ECC decoder may receive a digital read signal from analog front end 340 and include one or more soft output detectors (e.g., SOVA detectors) and iterative decoders (e.g., LDPC decoders) operating on multi-bit encoded symbols to decode each sector of data received by read/write channel 320. ECC configuration 324.1 may include a set of configuration parameters describing the ECC encoder and decoder configurations. For example, ECC configuration 324.1 may include settings for the specific ECC code to be used, including a corresponding code rate.

ECC encoder/decoder 324 and, more specifically, the ECC decoder may include a soft output detector 324.2, such as a SOVA detector. Soft output detector 324.2 may use a Viterbi-like algorithm to decode a bit stream for bit recovery. Soft output detector 324.2 may include a variant of the classical Viterbi algorithm. It may differ from the classical Viterbi algorithm in that it uses a modified path metric which takes into account a priori probabilities of the input symbols, and produces a soft output indicating the reliability of the decision. Soft output detector 324.2 may operate by constructing a trellis of the state of probabilities and branch metrics. In some examples, soft output detector 324.2 may be configured to detect the probabilities of bit values based on single parity check codes. Once the bit recovery is completed, parity post-processing can be performed. In some examples, an initial set of bit probabilities may be provided to an iterative decoder, such as an LDPC decoder, for parity-based decoding of the codeword, initiating iterative bit detection by iterative soft output detector 324.2 and parity determination by the inner iterative decoder with the two components exchanging sets of bit probabilities as extrinsic information for reaching their maximum likelihood results and returning a decoding decision. Bit LLR values may be determined at various points in the bit detection and decoding process. For drive, head/disk, zone, and sector level configuration parameters, the final LLR values of the ECC decoder (generally output by the ECC decoder after a successful codeword, sector, and/or track decode operations) may be used for determining mutual information.

Read/write channel 320 may include a modulation encoder/decoder 326 configured to use a modulation code 326.1 to modulate the user data stored to the storage medium and decode the modulated data during readback to recover the user data. For example, modulation code 326.1 may include a run length limited modulation code applied to user data prior to ECC encoding by ECC encoder/decoder 324. Modulation code 326.1 may also be used to decode the returned read data from ECC encoder/decoder 324. In some configurations, modulation code 326.1 may be described in a modulation code configuration stored by modulation encoder/decoder 326 and/or configuration settings 316 as modulation code parameters. Modulation code 326.1 may define modulation codewords with a corresponding code penalty 326.2 for using the modulation code to encode and decode data.

In some configurations, read/write channel 320 may include or access a sector configuration 328. For example, user data stored by read/write channel 320 may be stored in data sectors at variable areal densities and configuration data for those variable TPI and BPI parameters may be stored in read/write channel 320 or accessed from configuration settings 316 or storage locations on the storage medium. In some configurations, each sector in a zone may have a track frequency defined by zone configuration 330. For example, all tracks in the zone may have a fixed track density and corresponding TPI. In some configurations, sectors written to tracks within the zone may inherit track configuration settings from the zone but have different data frequencies. For example, sector configuration 328 may support different data frequencies and corresponding BPI for one or more sectors. Additionally, data sectors may have variable performance characteristics based on variable media characteristics, localized head/media interactions, servo variations, and other factors that may result in different read/write data quality. Therefore, it may be beneficial to calculate mutual information metrics on a per sector basis to evaluate sector performance and reliability, as well as aggregating sector mutual information into average track, zone, disk, etc. mutual information metrics. In some configurations, ECC configuration and modulation code may also be selected to optimize predicted sector failure rates.

In some configurations, read/write channel 320 may include or access a zone configuration 330. For example, the storage medium may be divided into concentric zones, each comprised of a set of adjacent tracks, and configuration data for variable TPI and/or BPI of those zones may be stored in read/write channel 320 or accessed from configuration settings 316 or storage locations on the storage medium. In some configurations, each zone may be defined by an inner track identifier and an outer track identifier and a track density may be configured for each zone. For example, because track length changes as tracks are arranged from the inner diameter to the outer diameter of the magnetic disk, it may improve areal density to use different track frequency and data frequency settings based on concentric zones. Zones may have variable performance characteristics based on variable media characteristics, localized head/media interactions, servo variations, and other factors that may result in different read/write data quality. Therefore, it may be beneficial to calculate mutual information metrics on a per zone basis to evaluate zone performance and reliability. In some configurations, these per zone mutual information metrics may be used to optimize the BPI/TPI and other read/write channel configurations settings for each zone.

In some configurations, read/write channel 320 may include one or more signal processing components 332 configured to modify the analog and/or digital read data signal to improve data detection and decoding by ECC encoder/decoder 324. For example, the read path may include any number of filters, such as equalizer 332.1 and noise filter 332.2. In some configurations, equalizer 332.1 and noise filter 332.2 may be implemented at least partially in a hardware circuit, such as a partial response filter, that includes a series of taps and associated tap weight settings that determine how the read signal is filtered. These tap weights may be initially configured during drive configuration for a set of default settings that may be optimized using mutual information metrics and assist the read/write channel in achieving an overall mutual information threshold. Additionally, the sets of tap weights may be dynamically adjusted throughout the operating life of the drive based on the ongoing performance of read/write channel 320. In some configurations, mutual information metrics may continue to be calculated based on runtime performance of the data storage device and used to adjust the sets of tap weights to maintain the mutual information threshold.

Servo controller 342 may include one or more specialized circuits configured to process servo data, such as position error signals, from the disk surfaces and providing a control signal to position the actuators in a closed-loop control system. Servo controller 342 may also receive commands from processor 304 for positioning operations, such as seek, track follow, load, unload, sweep, idle, and other actuator positioning operations. Servo controller 342 may also implement servo error recovery processes for recovering from servo errors. In some embodiments, servo controller 342 may include servo processor 344 and servo logic 346 (stored in a servo memory). For example, servo processor 344 may be a dedicated processor circuit and servo logic 346 may be firmware stored in RAM associated with the dedicated processor to provide dedicated computing resources for managing the servo functions. Servo controller 342 may receive servo signals read from the disk surface using preamp 322 and provided to servo controller 342. Servo controller 342 may provide servo control signals to motor controller 348 and motor controller 348 may control one or more actuator VCMs and/or a spindle motor for rotating the disk stack.

Figure 4:
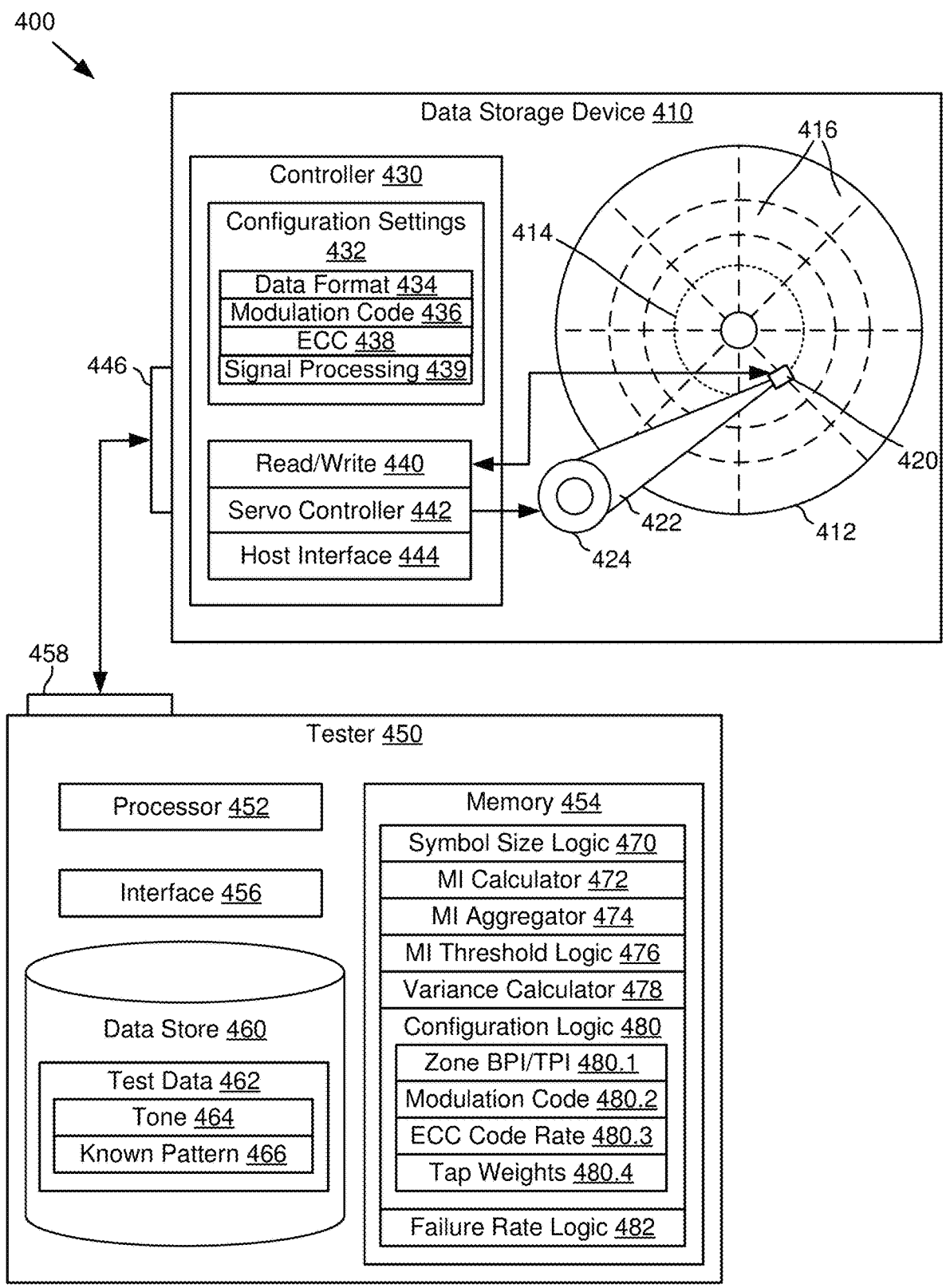
FIG. 4 is a diagram of a test system including a tester and data storage device being configured based on mutual information metrics.

FIG. 4 shows a test system 400 including a tester 450 and data storage device 410 for configuration based on mutual information metrics. Test system 400 may be used in conjunction with control circuitry 300 in FIG. 3 and/or the methods 600, 700, 800, 900, 1000 and/or 1100 of FIGS. 6-11.

In some configurations, data storage device 410 may be configured similarly to HDD 200 of FIG. 2 using control circuitry 300 of FIG. 3. Data storage device 410 may include a non-volatile storage medium 412. For example, non-volatile storage medium 412 may be a magnetic disk configured with a disk format similar to disk format 2 in FIG. 1. Storage medium 412 may include a plurality of data tracks 414 (though only one track is shown), such as concentric data tracks or spiral data tracks. In some configurations, the data tracks may be divided into a plurality of zones 416, where each zone comprises a set of adjacent data tracks between two radii.

Data storage device 410 may include a read/write head 420. For example, read/write head 420 may be configured similarly to head 208 in FIG. 2 and mounted at the distal end of arm 422 extending from actuator 424. Read/write head 420 may include write transducer elements and read transducer elements for writing data to storage medium 412 and reading data from storage medium 412. The read/write transducer elements in head 420 may be electrically connected to read/write channel circuit 440 for receiving write and read signals, such as through a flex circuit and preamp. Head 420 may be positioned over a target track on storage medium 412 by motor control signals from servo controller circuit 442 to actuator 424.

Controller 430 may include data storage device circuitry for controlling operation of data storage device 410. For example, controller 430 may be configured similarly to controller 302 in FIG. 3. In the configuration shown, controller 430 includes configuration settings 432, read/write channel circuit 440, servo controller circuit 442, and host interface circuit 444. For example, configuration settings 432 may be configured similarly to configuration settings 316 in FIG. 3, read/write channel circuit 440 may be configured similarly to read/write channel 320 in FIG. 3, servo controller circuit 442 may be configured similarly to servo controller 342 in FIG. 3, and host interface circuit 444 may be configured similarly to host interface 308 in FIG. 3.

In the configuration shown, configuration settings 432 may include data format settings 434, modulation code settings 436, ECC settings 438, and signal processing settings 439. For example, data format settings 434 may include track and data frequencies for various zones of storage medium 412, such as zones 416. These track and data frequencies may include a plurality of track and data parameters defining the track density (e.g., TPI) and bit density (e.g., BPI) of each zone and controller 430 may use those parameters for positioning head 420 using servo controller circuit 442 and writing data to and reading data from storage medium 412 using read/write channel circuit 440. In some configurations, data format settings may be determined using tester 450 to optimize the data format based on mutual information metrics, as further described below. Modulation code settings 436 may include the modulation code for use in modulating user data prior to storing it to storage medium 412. In some configurations, the modulation code may correspond to a code penalty and the modulation code and code penalty may be optimized based on mutual information metrics, as further described below. ECC settings 438 may include the error correction code, such as a specific LDPC code, used to encode and decode the data for improved data recovery during read operations. In some configurations, the selected code may correspond to a code rate and the ECC and code rate may be optimized based on mutual information metrics, as further described below. Signal processing settings 439 may include tap weights, equalization targets, noise compensation targets, and other parameters of the signal processing components. In some configurations, the selected tap weights and other parameters may be optimized based on mutual information metrics, as further described below. In some configurations, configuration settings 432 may be optimized based on a calculated mutual information metric meeting a mutual information threshold for data storage device 410 as a whole and a series of mutual information metrics and corresponding thresholds may be used for determining optimal values and tradeoffs among data format settings 434, modulation code settings 436, ECC settings 438, and signal processing settings 439.

In some configurations, data storage device 410 may be electrically connected to tester 450 during a manufacturing or configuration process. For example, following drive assembly and servo writing, each storage device may be loaded into a slot in a test rack that includes storage device interface. In some configurations, data storage device 410 may include one or more physical interface connectors 446. For example, interface connector 446 may include a PCIe, SATA, fibre channel, SCSI, or similar physical interface configured for host communication through host interface 444. Interface connector 446 may be configured to engage directly with a corresponding physical interface connector 458 on tester 450 and/or support a cable connection between interface connector 446 and interface connector 458. In some configurations, a plurality of connections may be made between data storage device 410 and tester 450, such as power, data, and control channels. In some configurations, data storage device 410 may include a test port for supporting a tester connection that is separate from the host interface connection.

Tester 450 may be configured as a computer system for testing and configuring one or more data storage devices, such as data storage device 410. Tester 450 may include a bus interconnecting at least one processor 452, at least one memory 454, and at least one system interface 456, such as a storage interface. The bus (not shown) may include one or more conductors that permit communication among the components of tester 450. Tester processor 452 may include any type of processor or microprocessor that interprets and executes instructions or operations. Tester memory 454 may include a random access memory (RAM) or another type of dynamic storage device that stores information and instructions for execution by processor 452 and/or a read only memory (ROM) or another type of static storage device that stores static information and instructions for use by processor 452 and/or any suitable storage element such as a hard disk or a solid state storage element. In some configurations, the bus may also connect to data store 460 for accessing non-volatile memory locations to support tester operations. In some configurations, the bus and/or system interface 456 may also connect to test stand 490 configured to test head and media components prior to integration into a data storage device.

System interface 456 may control electrical signals through physical interface connector 458 for connecting to the data storage device using an interface protocol that supports storage device access. For example, physical interface connector 456 may include a PCIe, SATA, SAS, or similar storage interface connector supporting host and/or test function access to data storage device 410 and/or components thereof. In some configurations, system interface 456 may include a test interface in addition to a host connection to data storage device 410 to enable additional test functions for accessing and configuring electrical components of data storage device 410, such as controller circuit 430, read/write channel circuit 440, servo controller circuit 442, and/or host interface circuit 444.

Tester 450 may include one or more non-volatile memory devices configured as data store 460 for storing store test data 462. For example, data store 460 may include one or more data storage devices, such as HDDs or solid-state drives (SSDs) providing non-volatile data storage for tester 450. In some configurations, test data 464 may include tone data patterns 464 and/or known data patterns 466 for use in testing and configuring data storage device 410. For example, tone data patterns 464 may include repeating data patterns, such a 1T, 2T, . . . nT data patterns. Known data patterns 466 may include simulated host data such as random data and/or data simulating specific user data types, configurations, and/or use cases. Tone data patterns 464 and/or known data patterns 466 may provide data to be written to and read from data storage device 410 to assist in testing and configuring data storage device 410 and components thereof. Test data 462 may be used by tester 450 to determine mutual information metrics, as further described below.

Tester 450 may include a plurality of modules or subsystems that are stored and/or instantiated in memory 454 for execution by processor 452 as instructions or operations. In some configurations, memory 454 may include a plurality of modules for determining mutual information metrics and using them to configure various configurations settings, such as configuration settings 432, in data storage device 410. For example, memory 454 may include symbol size logic 470, mutual information calculator 472, mutual information aggregator 474, mutual information threshold logic 476, and variance calculator 478 for determining and analyzing mutual information metrics and configuration logic 480 for determining configuration settings based on the mutual information metrics. In some configurations, memory 454 may include at least one module for using mutual information metrics to determine failure rates and/or other reliability metrics, such as failure rate logic 482. Each module may be embodied in software and/or hardware including interfaces, functions, data structures, and/or parameters for executing the described functions of that module.

Symbol size logic 470 may include hardware and/or software logic for determining a symbol size to use for mutual information calculations. For example, symbol size logic 470 may be based on the inter symbol interference present in a data storage device and/or the range of configurations that may be used in the data storage device. In some configurations, a default symbol size may be used, such as 4-bit or 5-bit symbols. In some configurations, an inter-symbol interference threshold may be determined for the data storage device. For example, a maximum value for a range of possible ISI values may be determined for the data storage device configuration as an ISI threshold and a multi-bit symbol size may be selected that compensates for the maximum ISI value. In some configurations, the smallest multi-bit symbol size that meets the ISI threshold may be selected to reduce the complexity of mutual information metric calculations.

Mutual information calculator 472 may include hardware and/or software logic for calculating mutual information metrics. For example, the mutual information equations above may be adapted to calculating mutual information from the LLR values calculated by read/write channel circuit 440 using appropriate test data 462. As described above, mutual information calculations may be based on a set of detected LLR bit values for a multi-bit symbol and corresponding known or ideal LLR bit values for that multi-bit symbol. Calculated mutual information values for each symbol in a data unit may be aggregated to determine aggregate mutual information metrics for that data unit. Mutual information aggregator 474 may include hardware and/or software logic to aggregate a series of mutual information values for a data unit, such as a codeword, sector, or zone. For example, MI aggregator 474 may sum the mutual information values and then divide by the number of values to determine an average mutual information value as the mutual information metric. In some configurations, mutual information may be aggregated at various levels. For example, mutual information for symbols may be aggregated across sets of symbols, such as a codeword. Mutual information for a set of codewords may be aggregated for a sector. Mutual information for a set of sectors may be aggregated for a track. Mutual information for a set of tracks may be aggregated for a zone, a platter surface, set of surfaces, or a drive.

Mutual information threshold logic 476 may include hardware and/or software logic for determining acceptable and/or target mutual information metrics for configuration of a data storage device, subsystems, and/or configuration settings thereof. For example, the overall goal of configuration of any give data storage system may be to maximize mutual information values and achieve as close to 1 as possible. As a mutual information value of 1 may not generally be possible, device designers and manufacturers may determine acceptable threshold values, such as 0.78, 0.8, or 0.83, that correspond to areal density or other targets for the data storage device. As described for MI aggregator 474, mutual information values may be aggregated into various metrics and those metrics may contribute to the mutual information values at various levels of the system. Similarly, mutual information thresholds may be allocated to specific subsystems and/or data units for achieving both localized mutual information values and drive-level mutual information metrics.

Variance calculator 478 may include hardware and/or software logic for determining variances of mutual information metrics around an average for a set of mutual information metrics. For example, as symbol mutual information is aggregated to higher-levels, variances may be determined within the set of mutual information metrics that have been averaged. In some configurations, this may be helpful for determining the relative contribution of data units to achieving mutual information metrics and/or identifying problematic or lower reliability data units. For example, mutual information variances may be used to determine sector failure rates and similar reliability metrics as described for failure rate logic 482.

Configuration logic 480 may include hardware and/or software logic for configuring configuration settings 432 in data storage device 410 using mutual information metrics and related thresholds. For example, zone BPI/TPI logic 480.1 may be used to determine data format settings 434 in a plurality of zones based on mutual information. In some configurations, zone BPI/TPI logic 480.1 may use mutual information metrics calculated for each zone to determine track and data frequencies. For example, different track frequency and data frequency configuration settings may be determined and mutual information calculated to determine the set of data format configuration settings that achieve the highest mutual information metric. The determined mutual information metric may be evaluated against an MI threshold for data format to determine whether an acceptable data format has been achieved.

As another example, modulation code logic 480.2 may be used to determine modulation code settings 436 based on mutual information. In some configurations, modulation code logic 480.2 may use mutual information to evaluate the efficiency of a plurality of modulation codes to determine a best modulation code for data storage device 410. For example, a modulation codeword may be used to calculate averaged multi-bit symbol mutual information values for a known data pattern and for the same known data pattern without modulation (e.g., unmodulated data prior to determining the modulation codeword). The MI metric for the modulation codeword may be compared to the MI metric for the unmodulated data. The difference of the mutual information metrics minus the code penalty of the modulation code may determine an areal density capability gain of the modulation code. Multiple modulation codes may be evaluated in this way to determine the modulation code that maximizes MI and/or meets an MI threshold.

As another example, ECC code rate logic 480.3 may be used to determine ECC settings 438 based on mutual information. In some configurations, the data format (BPI/TPI) may be used for evaluation of possible ECC configurations, such as LDPC codes with differing code rates. For example, MI (TPI, BPI)*TPI*BPI may be proportional to arial density and may be used for optimization. For code rate R, areal density may equal BPI*TPI*R. In some configurations, different LDPC codes may be used and their corresponding mutual information determined, such that the highest mutual information metric will indicate the optimal LDPC code. For example, a plurality of different LDPC codes may be used to calculate mutual information metrics from known data and the LDPC code with the highest mutual information value may be selected for ECC settings 438.

As another example, tap weights logic 480.4 may be used to iteratively test a range of tap weight settings across a range of possible tap weights for signal processing settings 439. For example, each filter, such as equalizers, noise filters, and other signal processing components, may include a working range for the weight value of each tap and tap weights logic 480.4 may include logic for varying the possible tap weights in those ranges based on iterative feedback and optimization against one or more target signal values/profiles. The mutual information metrics and changes of those mutual information metrics may be used in the feedback loop of tap weights logic 580.4 to improve (reduce) the test time required to settle on an optimal set of tap weights. In some configurations, similar logic may be used to adjust the tap weights throughout the operating life of the data storage device.

Failure rate logic 482 may include hardware and/or software logic for determining failure rates or other reliability information of different data units based on mutual information. For example, failure rate logic 482 may be used to calculate mutual information metrics for a data unit, such as a sector or codeword, and use MI variance to determine the relative reliability of different data units. In some configurations, MI thresholds may be applied to identify sectors with variance and/or absolute MI values that suggest likely read failure. For example, during configuration and/or throughout the life of the data storage device, data storage device 410 may apply bad sector logic to move data from the identified sectors with mutual information values below a data quality threshold.

As shown in FIGS. 5A-5D, control circuitry 300 and/or test system 400 may be used to determine the tradeoffs among various configuration settings, such as ECC code rate, modulation code, and bit size (BPI/TPI), using mutual information determined across the possible states of each symbol and generally aggregated across a larger frame, such as a sector. A known pattern may be written to the sector and then read back for the calculation of mutual information. The comparison of the written and read signals may be used to generate a variety of mutual information values and metrics, including the calculation of symbol context mutual information. For example, based on a selected multi-bit symbol size, the range of symbol contexts corresponding to each possible value or state of the symbol may be determined (e.g., 64 states for a 6-bit symbol, 512 states for a 9-bit symbol, etc.). The mutual information may be calculated for symbol context and averages across the data frame may be used to determine various relationships among the configuration settings. In some configurations, once the symbol context mutual information is determined, it may be processed in various ways to determine optimal configuration settings without needing to write additional data to the storage medium.

Figure 5A:
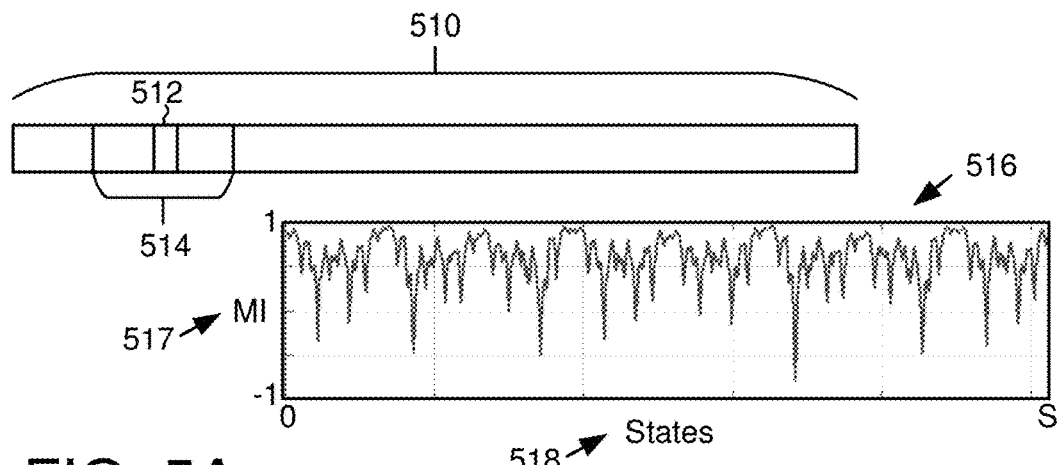
FIGS. 5A, 5B, 5C, and 5D are diagrams showing a series of calculations for determining configuration settings based on mutual information metrics.

In FIG. 5A, a sector 510 of data is shown and may include a state window 514 corresponding to the number of bits in a multi-bit symbol and includes a bit 512. State context may be defined for bit 512 and a corresponding symbol in state window 514 in sector 510. In some configurations, MI for the sector may initially be determined on a state context basis. For example, a context may have n bits and a number of possible states $S=2^n$. Sector MI may be calculated:

$$I = \frac{1}{N}\sum_{i=1}^{N} I_i = \frac{1}{N}\sum_{k=1}^{S}\sum_{j=1}^{N_S} I_{kj} = \frac{1}{S}\sum_{k=1}^{S} I_k$$

MI may be averaged for each context and each context may have a different MI value. In some configurations, MI may be determined for the range of state contexts as shown in graph 516. For example, MI values may be plotted on the y axis, labeled MI 517, for a range of state contexts on the x axis, labeled States 518, from 0 to S, where each state context has a different MI value. In some configurations, initial modulation codes may be selected to exclude the state contexts with negative mutual information values.

Figure 5B:
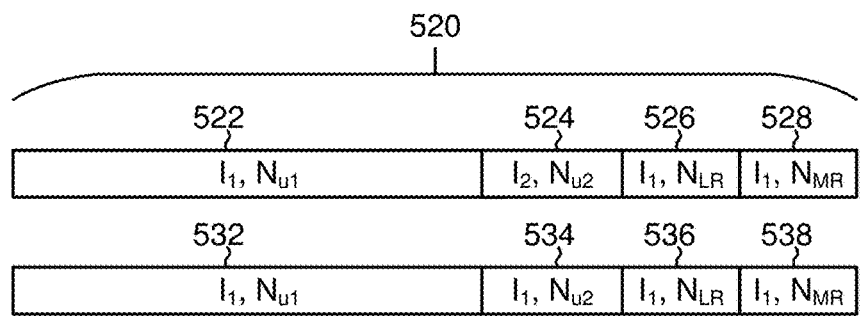

In FIG. 5B, the tradeoff between modulation codes (and code penalties) and LDPC codes (and code rates) may be evaluated and determined on a sector basis for an example sector 520. Mutual information values (I) may be calculated for modulation codes (M) and ECC (L). Sector 520 may be divided between user data having good and bad mutual information due to different contexts (from FIG. 5A). $I_1$ may be the MI for the majority of the bits in the sector ("normal" bits) and $I_2$ may be the MI for bad bits (transition states). $N_{u1}$ may be the number of good user bits and $N_{u2}$ may be the number of bad user bits. Good bits may include the bit count of symbols having negative mutual information values and bad bits may include the bit count of symbols having at least zero mutual information. $N_{LR}$ may be the ECC redundancy bits (corresponding to the ECC code rate penalty) having an average $I_1$ MI and $N_{MR}$ may be the modulation code redundancy (corresponding to the modulation code penalty) and the modulation code will convert bit $N_{u2}$ to good bits having $I_1$. The sector may be modeled without modulation and use $N_{LR}$ as additional ECC redundancy to determine which outcomes are better based on mutual information. The proportions of these bits and how they relate are shown for sector 520. For calculating $I_M$, blocks 522, 524, 526, and 528 may be used. For calculating $I_L$, blocks 532, 534, 536, and 538 may be used. The general relationship for the tradeoff is governed by $I_M - I_L > 0$. The following equations describe the dependency or tradeoff between modulation codes and ECC code rates:

$$I_M = \frac{I_1 N_{u1} + I_1 N_{u2} + I_1 N_{LR} + I_1 N_{MR}}{N_{u1} + N_{u2} + N_{LR} + N_{MR}} - \frac{N_{u1} + N_{u2} + N_{MR}}{N_{u1} + N_{u2} + N_{LR} + N_{MR}}$$

$$I_L = \frac{I_1 N_{u1} + I_2 N_{u2} + I_1 N_{LR} + I_1 N_{MR}}{N_{u1} + N_{u2} + N_{LR} + N_{MR}} - \frac{N_{u1} + N_{u2}}{N_{u1} + N_{u2} + N_{LR} + N_{MR}}$$

$$\frac{I_1 N_{u2} - I_2 N_{u2}}{N_{u1} + N_{u2} + N_{LR} + N_{MR}} - \frac{N_{MR}}{N_{u1} + N_{u2} + N_{LR} + N_{MR}} > 0$$

$$I_2 < I_1 - \frac{N_{MR}}{N_{u2}} \approx 0$$

These equations show that modulation code is more efficient only in the case when $I_2 < 0$ and modulation codes should be selected to eliminate contexts that have negative MI. If no state contexts have negative MI, then additional ECC redundancy may be more effective for optimizing the storage device configuration.

Figure 5C:
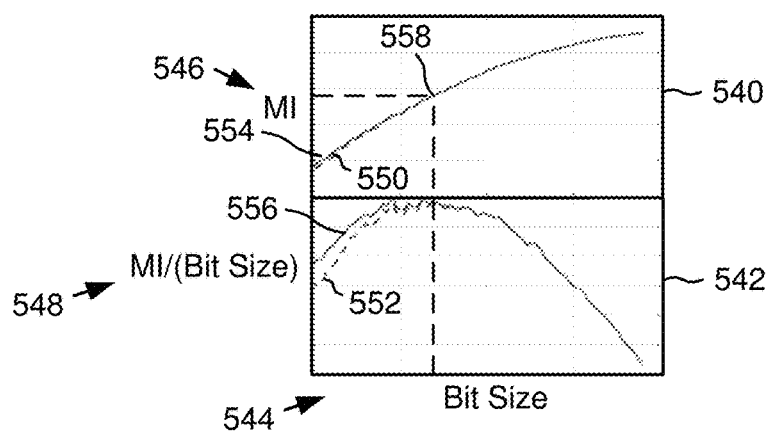

In FIG. 5C, MI may be used to optimize ECC code rate, such as LDPC code rate. Graph 540 shows the dependence of MI 546 versus bit size (BPI/TPI) 544 and graph 542 shows MI per bit size 548 versus bit size 544. The dashed lines 550, 552 represent MI for random, unmodulated data. In some configurations, it is derived from averaging the data in graph 516 of FIG. 5A. The solid lines 554, 556 represent data using an optimal modulation code, also based on graph 516 of FIG. 5A. The optimal modulation code may be determined based on eliminating all state contexts that have negative MI in graph 516. Modulation code rate (and code penalty) may be taken into account for solid lines 554, 556. For the optimal modulation code, code rate would be dependent on areal density, as represented by bit size. Graph 542 shows MI/bit size, which may be proportional to data areal density, versus bit size. The bottom graph indicates the bit size where the best areal density may be achieved, marked by line 558. At this bit size, the data will have the specific MI value shown at line 558 in the top graph. This MI may define what LDPC code rate is optimal, as well as whether a modulation code is needed.

Figure 5D:
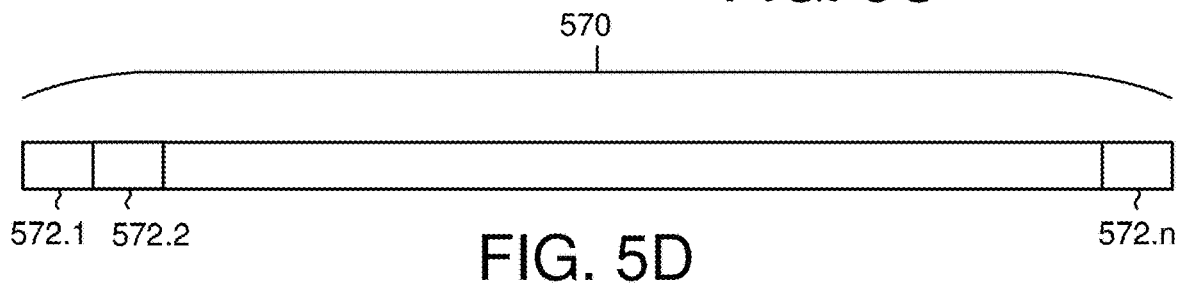

In FIG. 5D, encoding efficiency and, more specifically, modulation code penalty, may be evaluated using context dependent MI. Again, MI may be calculated for different state contexts as described above for FIG. 5A. Sector MI may be calculated for any modulation code designed. For example, codeword 570 may be divided into symbols 572.1-572.n and $I_i$ may be assigned to each using symbol context. Average MI for the sector may then be compared before and after application of the proposed modulation code, taking into account modulation code penalty. For example, the average MI may be calculated by:

$$I = \frac{1}{N}\sum_{i=1}^{N} I_i$$

This approach may be executed for a number of proposed modulation codes to determine one or more modulation codes that may be selected to achieve overall MI values meeting the MI threshold for the configuration.

Figure 6:
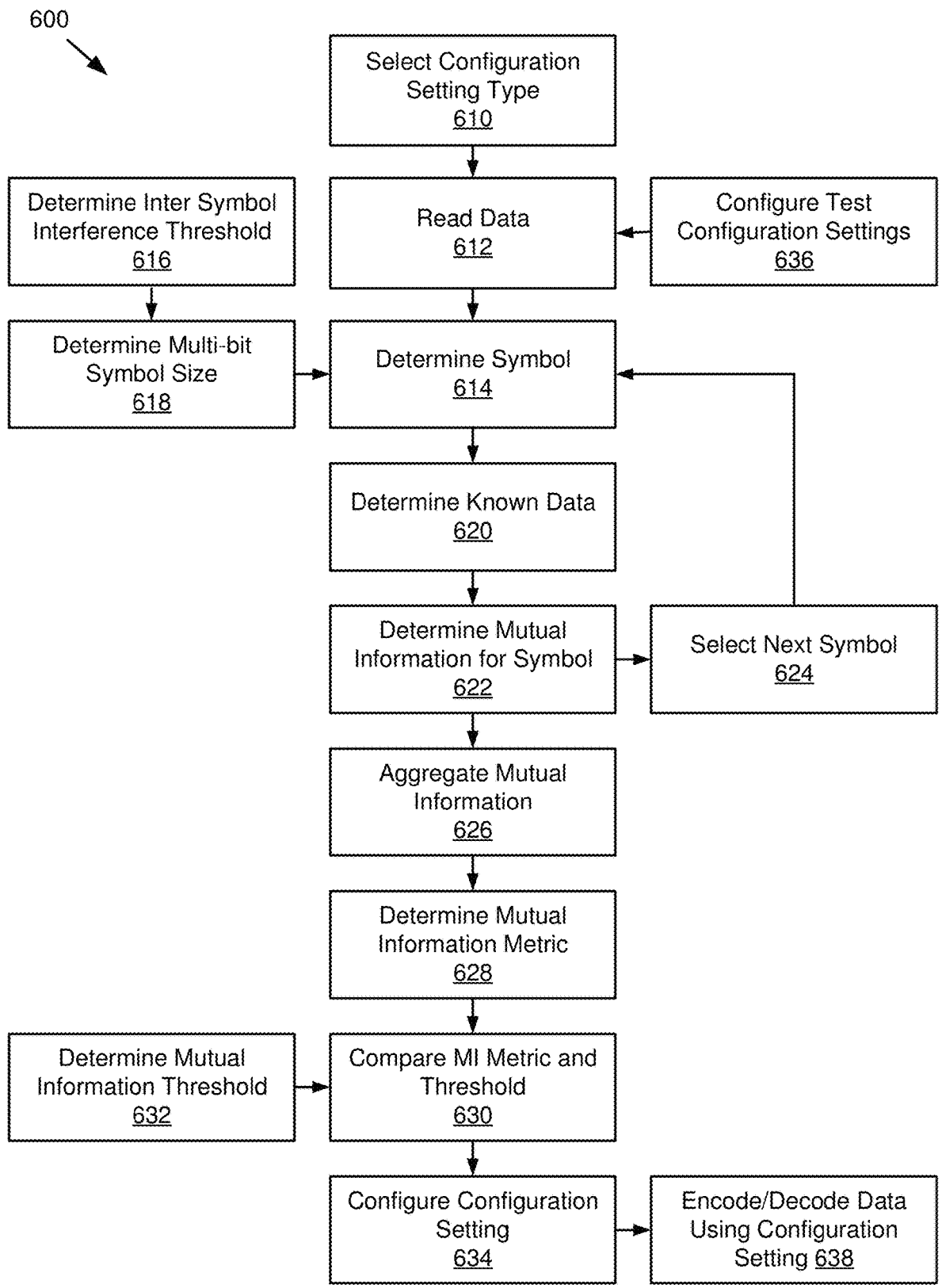
FIG. 6 is an example method of configuring configuration settings based on mutual information metrics.

As shown in FIG. 6, control circuitry 300 and/or test system 400 may be operated according to an example method of configuring configuration settings based on mutual information metrics, i.e., according to the method 600 illustrated by blocks 610-638.

At block 610, a configuration setting type may be selected. For example, method 600 may be used for configuring a number of different settings for a data storage device, such as data format, modulation code, and/or ECC settings, and a controller may select the settings to be optimized during any given configuration operation.

At block 612, data may be read. For example, the data storage device may read test data previously written to its storage medium and determine LLR values for each bit through iterative bit detection and decoding by the read channel.

At block 614, symbols may be determined. For example, the read channel may process the read data signal in sequential sets of multi-bit symbols. In some configurations, an inter symbol interference threshold may be determined at block 616 and a multi-bit symbol size meeting that threshold may be determined at block 618. For example, prior analysis of read channel performance for similar data storage device configurations may be used to determine an appropriate multi-bit symbol size for compensating for ISI in mutual information calculations.

At block 620, known data corresponding to the read data may be determined. For example, the controller or tester may include or access the actual bit values of the test data.

At block 622, mutual information may be determined for the symbol. For example, the controller or tester may calculate the mutual information for each multi-bit symbol in the read data signal based on LLR values from the read operation and LLR values for the known data.

At block 624, a next symbol may be selected from the read data signal. For example, method 600 may return to block 614 to determine a next sequential set of multi-bit symbols from the read operation. This return loop may continue until mutual information values are determined for all of the symbols in the target test data and corresponding read operations.

At block 626, mutual information may be aggregated. For example, the controller or tester may aggregate symbol mutual information values across read data signals and read operations for one or more data units of interest, such as codewords, sectors, tracks, zones, etc.

At block 628, a mutual information metric may be determined. For example, the controller or tester may use the average of symbol mutual information values aggregated at block 626 to determine a mutual information metric for a selected set of read data.

At block 630, the mutual information metric may be compared to a mutual information threshold. For example, the controller or tester may compare the mutual information metric determined at block 628 to a previously determined mutual information threshold. In some configurations, the mutual information threshold may be determined at block 632. For example, a mutual information threshold value may be set as a minimum acceptable average mutual information value for a configuration and/or the highest mutual information value of a previously tested configuration (in order to determine the configuration with the highest mutual information value).

At block 634, a configuration setting may be configured. For example, the controller or tester may select the configuration settings corresponding to the test configuration settings used to determine a mutual information metric that met or exceeded the mutual information threshold at block 630. In some configurations, configuration test settings, comprised of a proposed set of configuration settings, may be selected at block 636 for multiple iterations through method 600 to test and compare mutual information metrics from variations in those settings. For example, a series of data formats, modulation codes, or ECC codes may be tested to determine the highest mutual information metrics among the proposed configuration settings.

At block 638, the configuration settings may be used to encode and decode data during data storage device operation. For example, method 600 may be executed during manufacture or initial configuration of the data storage device and/or at other times over the life of the data storage device to determine the production set of configuration settings to be used by the device for storing and retrieving user data.

Figure 7:
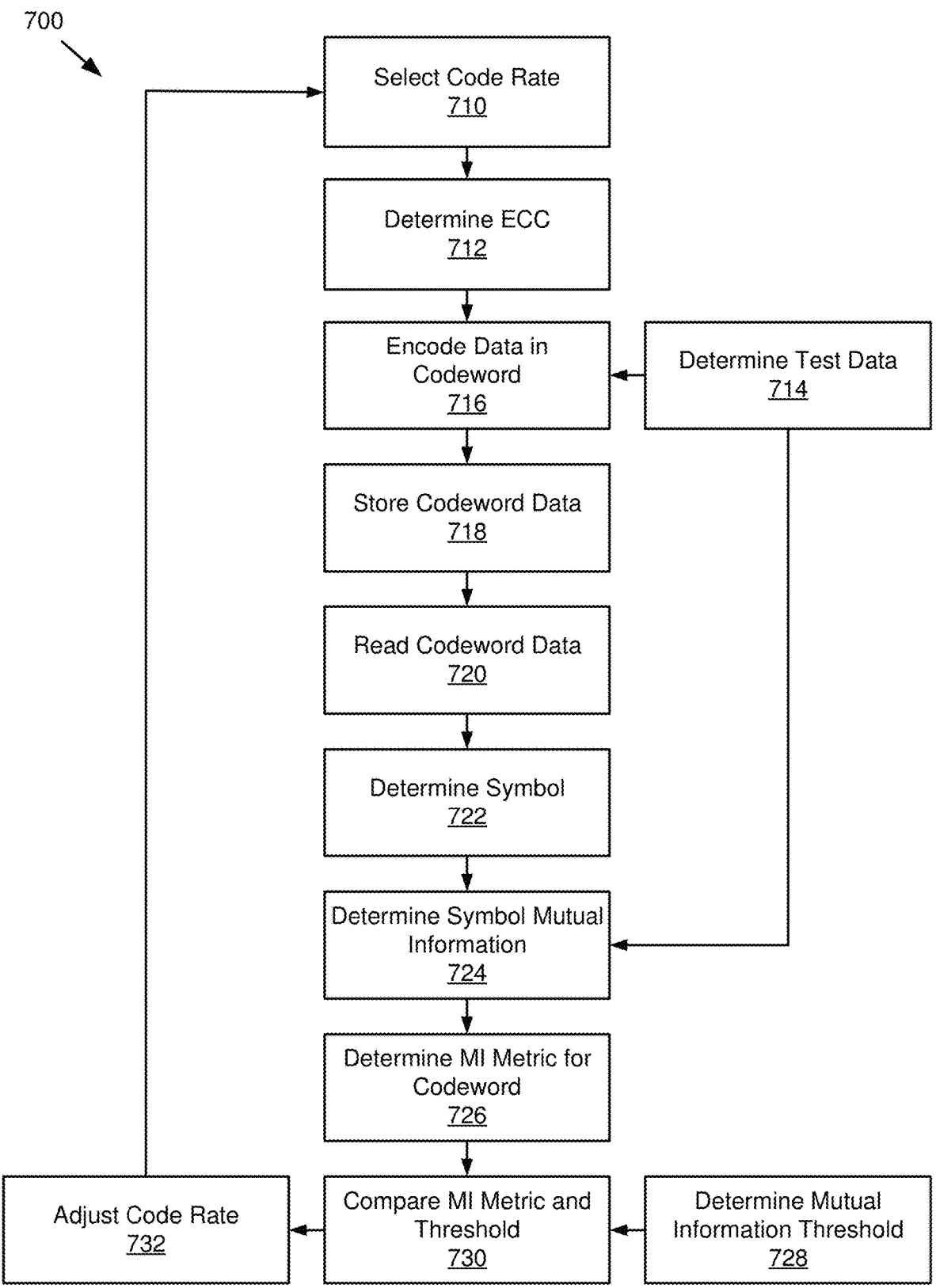
FIG. 7 is an example method of configuring error correction code settings based on mutual information metrics.

As shown in FIG. 7, control circuitry 300 and/or test system 400 may be operated according to an example method of configuring error correction code settings based on mutual information metrics, i.e., according to the method 700 illustrated by blocks 710-732.

At block 710, a code rate may be selected for testing an ECC configuration. For example, the controller or tester may select a code rate based on a default configuration and/or a prior iteration through method 700 and/or method 1100.

At block 712, an error correction code may be determined. For example, the controller or tester may select an error correction code with code rate determined at block 710.

At block 714, test data may be determined. For example, the tester or controller may be configured with test data having a known set of bits to be written to and read from the storage medium of the data storage device.

At block 716, the test data may be encoded in a codeword corresponding to the selected ECC. For example, an LDPC encoder in the read/write circuit of the data storage device may encode the test data using a selected LDPC code to be tested.

At block 718, the codeword data may be stored to the storage medium. For example, the data storage device may write the encoded test data as codewords to the storage medium using the write channel to the write transducer of the read/write head.

At block 720, the codeword data may be read from the storage medium. For example, the data storage device may read the encoded test data from the storage medium using the read channel from the read transducer of the read/write head.

At block 722, a symbol may be determined. For example, the read channel may divide the read data signal from the read operation into multi-bit symbols for mutual information calculation.

At block 724, symbol mutual information may be determined. For example, the controller or tester may use the LLR values from the read operation at block 720 and known LLR values based on the test data to calculate mutual information values for each symbol.

At block 726, mutual information metrics may be determined for codewords. For example, the symbol mutual information values for the set of symbols corresponding to the codeword may be aggregated to determine a mutual information metric for each codeword in the read operation.

At block 728, a mutual information threshold may be determined for evaluation of the mutual information metrics. For example, a mutual information threshold may be defined for acceptable ECC configurations and/or the mutual information metric of a prior code rate and configuration may be used as a threshold for determining whether the LDPC code being tested results in a higher mutual information metric.

At block 730, the mutual information metric may be compared to the mutual information threshold. For example, the controller or tester may evaluate the LDPC code being tested against a baseline mutual information threshold and/or the mutual information metrics achieved by other code rates and corresponding LDPC codes for the data storage device. The outcome of these comparisons may include adjusting the code rate for additional test iterations at block 732 or selecting the ECC configuration with the highest mutual information metric for production use and setting the ECC settings of the data storage device, as the mutual information metric may correspond to the upper boundary of the code rate that can successfully decode a codeword having that metric.

At block 732, the code rate may be adjusted for additional test iterations. For example, analysis of the prior mutual information metrics may suggest a next code rate to try (lower or higher). In some configurations, a range of code rates may be defined and a sweep algorithm may be used for determining the code rate to test in each iteration.

Figure 8:
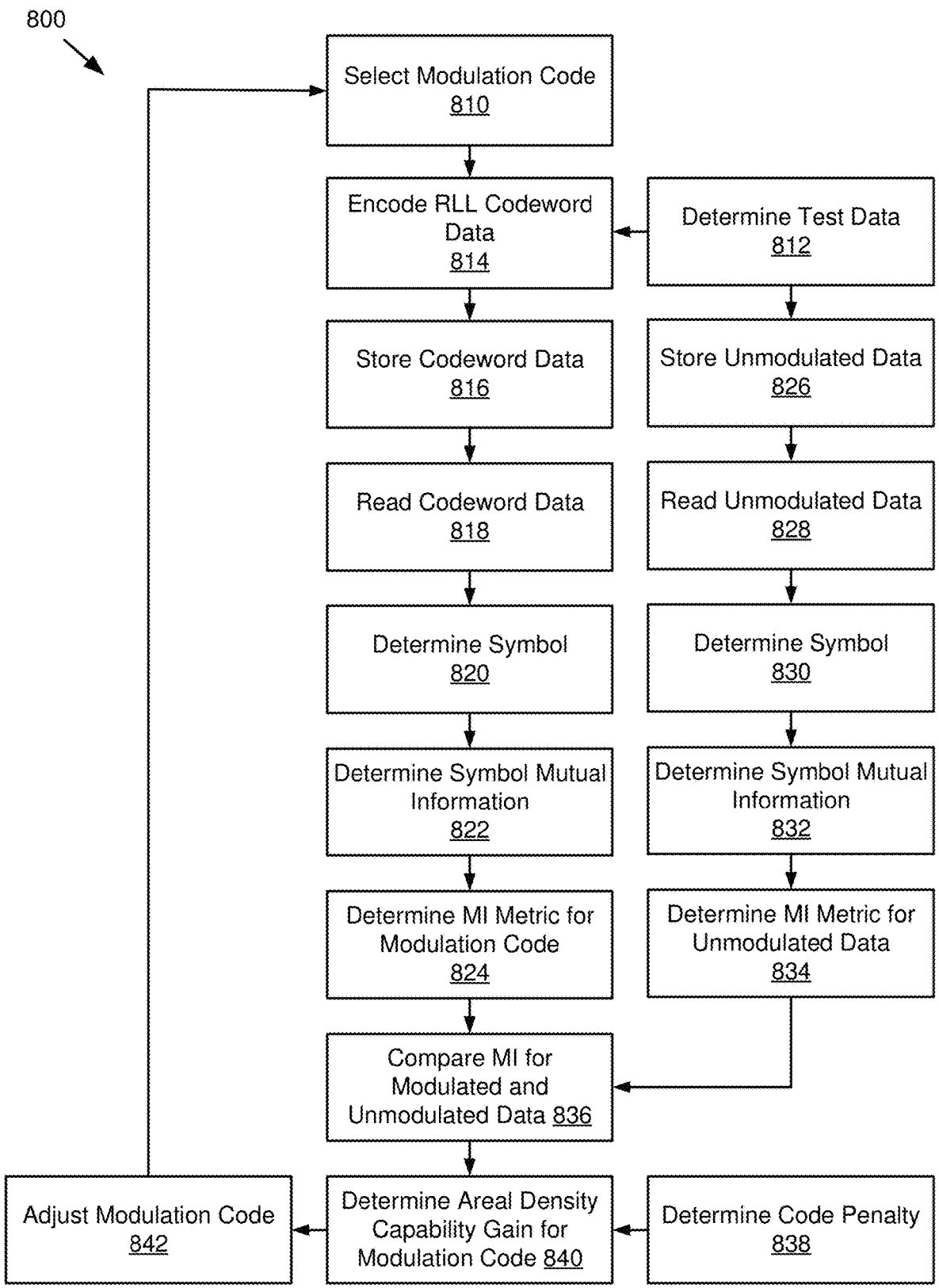
FIG. 8 is an example method of configuring modulation code settings based on mutual information metrics.

As shown in FIG. 8, control circuitry 300 and/or test system 400 may be operated according to an example method of configuring modulation code settings based on mutual information metrics, i.e., according to the method 800 illustrated by blocks 810-842.

At block 810, a modulation code may be selected for testing an modulation code configuration. For example, the controller or tester may select a modulation code based on a default configuration and/or a prior iteration through method 800 and/or method 1100.

At block 812, test data may be determined. For example, the tester or controller may be configured with test data having a known set of bits to be written to and read from the storage medium of the data storage device.

At block 814, the test data may be encoded in a codeword corresponding to the selected modulation. For example, an RLL encoder in the read/write circuit of the data storage device may encode the test data using a selected modulation code to be tested.

At block 816, the codeword data may be stored to the storage medium. For example, the data storage device may write the encoded test data as codewords to the storage medium using the write channel to the write transducer of the read/write head.

At block 818, the codeword data may be read from the storage medium. For example, the data storage device may read the encoded test data from the storage medium using the read channel from the read transducer of the read/write head.

At block 820, a symbol may be determined. For example, the read channel may divide the read data signal from the read operation into multi-bit symbols for mutual information calculation.

At block 822, symbol mutual information may be determined. For example, the controller or tester may use the LLR values from the read operation at block 818 and known LLR values based on the test data to calculate mutual information values for each symbol.

At block 824, mutual information metrics may be determined for codewords. For example, the symbol mutual information values for the set of symbols corresponding to the codeword may be aggregated to determine a mutual information metric for each codeword in the read operation.

At block 826, unmodulated data may be stored to the storage medium. For example, the data storage device may write the unmodulated test data to the storage medium using the write channel to the write transducer of the read/write head.

At block 828, the unmodulated data may be read from the storage medium. For example, the data storage device may read the unmodulated test data from the storage medium using the read channel from the read transducer of the read/write head.

At block 830, a symbol may be determined. For example, the read channel may divide the read data signal from the read operation into multi-bit symbols for mutual information calculation.

At block 832, symbol mutual information may be determined. For example, the controller or tester may use the LLR values from the read operation at block 838 and known LLR values based on the test data to calculate mutual information values for each symbol.

At block 834, mutual information metrics may be determined for codewords. For example, the symbol mutual information values for the set of symbols corresponding to the same test data as the codeword at block 824 may be aggregated to determine a mutual information metric for that segment of unmodulated data.

At block 836, the mutual information metric for the modulated codeword may be compared to the mutual information metric for the unmodulated data. For example, the controller or tester may use the unmodulated data as the mutual information threshold for evaluating the modulation code.

At block 838, a code penalty may be determined. For example, each modulation code corresponds to a code penalty based on any additional bits needed to comply with the modulation code.

At block 840, an areal density capability gain for the modulation code may be determined. For example, the difference in mutual information metrics, minus the code penalty, corresponds to the areal density capability gain of the modulation code.

At block 842, the modulation code may be adjusted for additional test iterations. For example, analysis of the prior mutual information metrics may suggest a next modulation code to try (lower or higher) for a desired areal density capability gain. In some configurations, a range or set of modulation codes may be defined and selected in turn to be used for determining the modulation code to test in each iteration.

Figure 9:
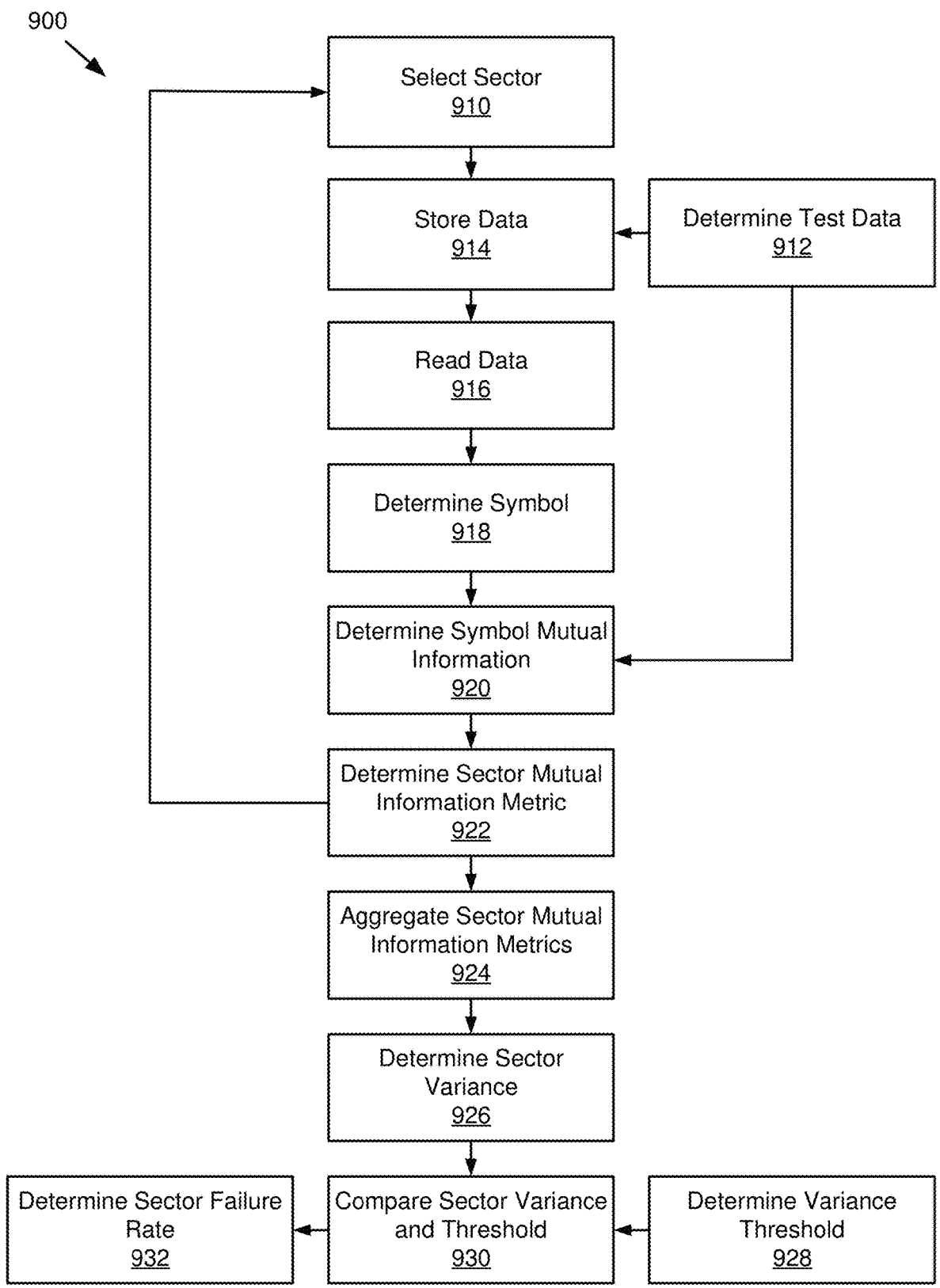
FIG. 9 is an example method of determining sector failure rate based on mutual information metrics.

As shown in FIG. 9, control circuitry 300 and/or test system 400 may be operated according to an example method of determining sector failure rate based on mutual information metrics, i.e., according to the method 800 illustrated by blocks 910-932.

At block 910, a sector may be selected for determining a sector failure rate. For example, the controller or tester may determine a set of sectors to be tested for sector failure rate through method 900 and select each sector in turn.

At block 912, test data may be determined. For example, the tester or controller may be configured with test data having a known set of bits to be written to and read from the storage medium of the data storage device. In some configurations, a data storage device controller may be configured to use user data as test data for sector failure rate based on treating successfully decoded sector data as the known data. For example, upon successful decode of the data sector by the read channel, the bit values may be used for mutual information calculations.

At block 914, the test data may be written to the storage medium of the data storage device. For example, the read/write circuit may use its production configuration settings and corresponding data format, ECC, and modulation code configurations to write the test data to the storage medium. Note that block 914 may not be used when previously written test data and/or stored user data are being used as test data.

At block 916, the test data may be read from the storage medium. For example, the data storage device may read the test data from the storage medium using the read channel from the read transducer of the read/write head.

At block 918, a symbol may be determined. For example, the read channel may divide the read data signal from the read operation into multi-bit symbols for mutual information calculation.

At block 920, symbol mutual information may be determined. For example, the controller or tester may use the LLR values from the read operation at block 916 and known LLR values based on the test data to calculate mutual information values for each symbol.

At block 922, mutual information metrics may be determined for the sector. For example, the symbol mutual information values for the set of symbols corresponding to the sector may be aggregated to determine a mutual information metric for that sector. Method 900 may return to block 910 to select a next sector in the set of sectors being tested.

At block 924, sector mutual information metrics may be aggregated. For example, the controller or tester may average the sector mutual information metrics for each sector in the set of sectors.

At block 926, a sector variance may be determined for each sector mutual information. For example, based on the average across sectors, a variance for the mutual information of each sector in the set of sectors may be determined.

At block 928, a mutual information variance threshold may be determined. For example, based on prior characterization of sector failures based on mutual information variance within a drive population, one or more predictive failure thresholds may be determined based on mutual information variance. In some configurations, the predictive failure thresholds may be mapped to one or more sector reliability metrics and/or classifications, At block 930, the sector mutual information variances may be compared to the mutual information variance threshold. For example, the variance thresholds may be used to classify sectors into mutual information variance bands.

At block 932, a sector failure rate may be determined. For example, the mutual information variance bands may be mapped to predicted sector failure rates based on prior characterization of sector failure rates for a similar populations of data storage devices.

Figure 10:
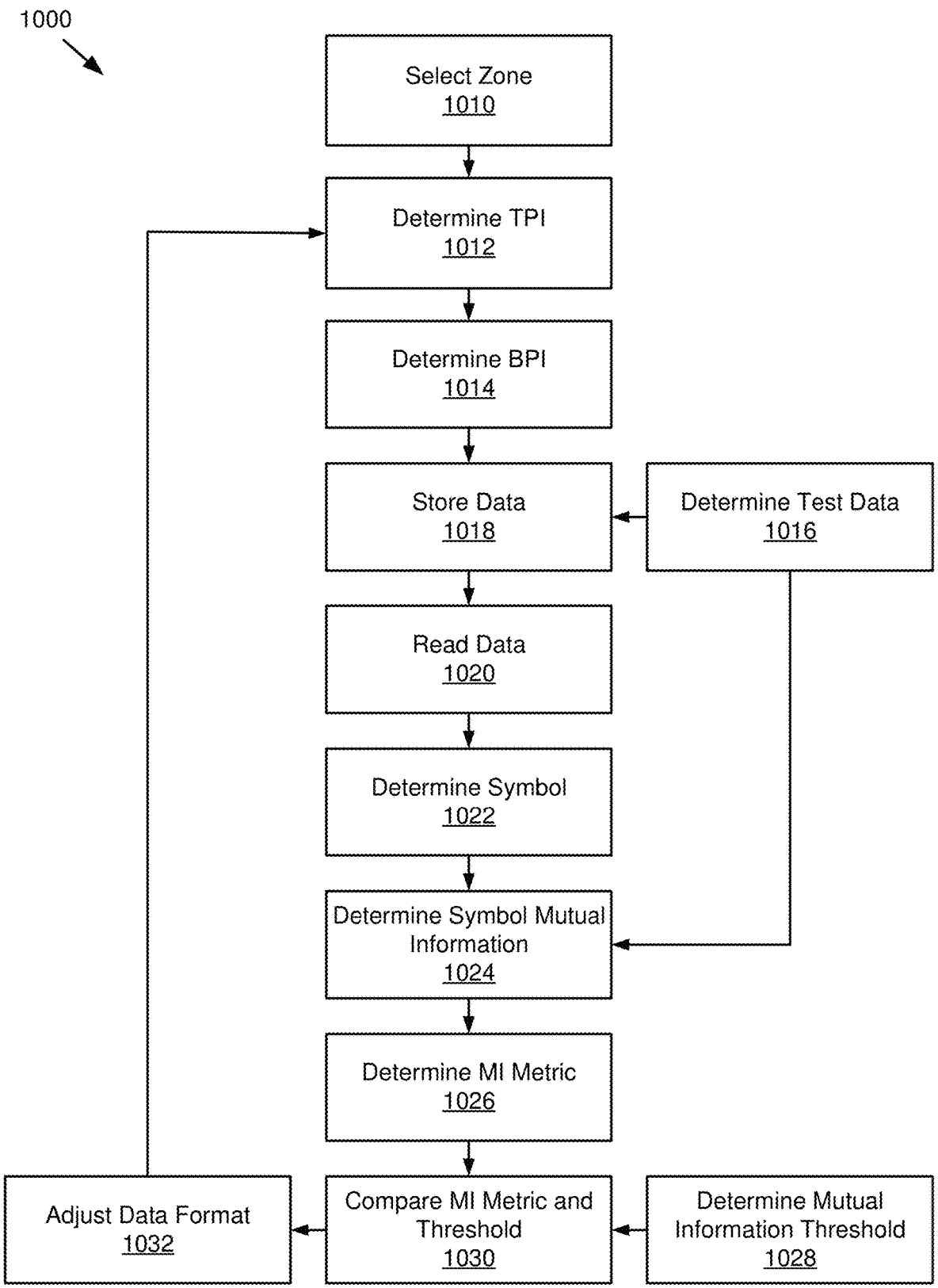
FIG. 10 is an example method of determining zoned track and linear densities based on mutual information metrics.

As shown in FIG. 10, control circuitry 300 and/or test system 400 may be operated according to an example method of determining zoned track and linear densities based on mutual information metrics, i.e., according to the method 1000 illustrated by blocks 1010-1032.

At block 1010, a zone may be selected for testing a data format configuration. For example, the controller or tester may select each zone of a magnetic disk in turn for execution of method 1000.

At block 1012, a track density, such as TPI or another track pitch parameter, may be determined. For example, the controller or tester may select a track density for a data format iteration based on a default TPI value or range of TPI values to be tested.

At block 1014, a data frequency or linear density, such as BPI or another bit density parameter, may be determined. For example, the controller or tester may select a data frequency for the data format iteration based on a default BPI or range of BPI values to be tested.

At block 1016, test data may be determined. For example, the tester or controller may be configured with test data having a known set of bits to be written to and read from the storage medium of the data storage device.

At block 1018, the test data may be stored to the storage medium. For example, the read/write circuit may use default or previously determined configuration settings for ECC and modulation code configurations to write the test data to the storage medium.

At block 1020, the codeword data may be read from the storage medium. For example, the data storage device may read the test data from the storage medium using the read channel from the read transducer of the read/write head.

At block 1022, a symbol may be determined. For example, the read channel may divide the read data signal from the read operation into multi-bit symbols for mutual information calculation.

At block 1024, symbol mutual information may be determined. For example, the controller or tester may use the LLR values from the read operation at block 1020 and known LLR values based on the test data to calculate mutual information values for each symbol.

At block 1026, mutual information metrics may be determined for the test data written to and read from the zone. For example, the symbol mutual information values for the set of symbols read may be aggregated to determine a mutual information metric for the zone. In some configurations, a sampling of tracks and/or sectors in a zone may be used for determining the mutual information metric rather than all tracks and/or sectors.

At block 1028, a mutual information threshold may be determined for evaluation of the mutual information metrics. For example, a mutual information threshold may be defined for acceptable data format configurations and/or the mutual information metric of a prior data format configuration may be used as a threshold for determining whether the BPJ/TPI being tested results in a higher mutual information metric.

At block 1030, the mutual information metric may be compared to the mutual information threshold. For example, the controller or tester may evaluate the data format being tested against a baseline mutual information threshold and/or the mutual information metrics achieved by other data formats and corresponding BPI/TPI settings for the data storage device. The outcome of these comparisons may include adjusting the data format for additional test iterations at block 1032 or selecting the data format configuration with the highest mutual information metric for production use and setting the data format settings of the data storage device.

At block 1032, the data format (e.g., BPI/TPI) may be adjusted for additional test iterations. For example, analysis of the prior mutual information metrics may suggest a next BPI and/or TPI to try (lower or higher). In some configurations, a range of track densities and a range of data frequencies may be defined and a sweep algorithm may be used for determining the data format to test in each iteration.

Figure 11:
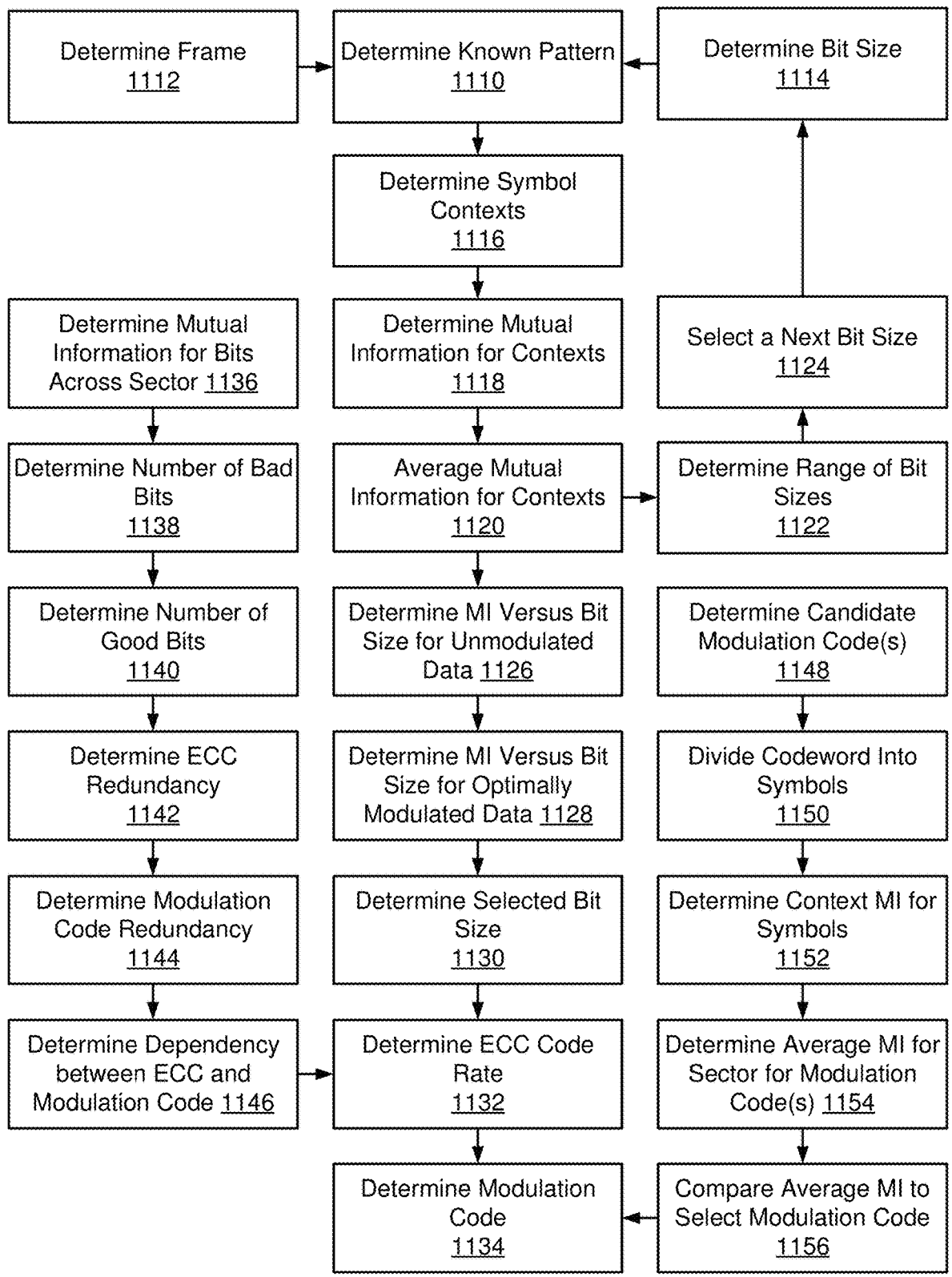
FIG. 11 is an example method of determining configuration setting tradeoffs based on mutual information metrics.

As shown in FIG. 11, control circuitry 300 and/or test system 400 may be operated according to an example method of determining configuration setting tradeoffs, such as among bit size, ECC, and modulation code, based on mutual information metrics, i.e., according to the method 1100 illustrated by blocks 1110-1156. Method 1100 may be further described with reference to FIGS. 5A-5D above.

At block 1110, a known pattern may be determined. For example, a tester or controller may write a test pattern to a target sector and read it back to characterize the sector.

At block 1112, a data frame may be determined. For example, in a data storage device organized by sectors, sectors may be selected as the data frame of interest, but method 1100 may operate on other data frames (longer or shorter) selected to be configured with similar sets of configuration settings.

At block 1114, a bit size may be determined. For example, the known pattern may be based on writing the known pattern at a selected bit size (defined by BPI and TPI) that may correspond to the smallest bit size in the range of bit sizes that would be considered for the configuration of the data storage device (and may be informed by prior head/media characterization).

At block 1116, symbol contexts may be determined. For example, based on a selected multi-bit symbol size, the controller or tester may generate a series of symbol contexts based on all of the different possible states for that symbol length.

At block 1118, mutual information may be determined for the symbol contexts. For example, the controller or tester may calculate mutual information for each symbol context based on the bit values from writing and reading the known pattern.

At block 1120, mutual information may be averaged across symbol contexts. For example, the controller or tester may average the mutual information for each symbol context across the sector or other data frame.

In some configurations, a range of bit sizes may be characterized according to blocks 1110-1120. At block 1122, a range of bit sizes may be determined for characterization. For example, the controller or tester may include a range of possible BPI and TPI settings that would correspond to different bit sizes.

At block 1124, a next bit size in the range may be selected. For example, the controller or tester may include increments for defining a set of bit sizes in the range to characterize and iterate to the next bit size for each pass through blocks 1110-1120 and continue to block 1114.

At block 1126, mutual information versus bit size may be determined for unmodulated data. For example, the controller or tester may use the average MI for symbol context determined at block 1120 to determine average MI at each bit size to determine a first curve.

At block 1128, mutual information versus bit size may be determined for optimally modulated data. For example, the controller or tester may assume a modulation code that excludes all symbol contexts with negative mutual information and remove those symbol contexts from the averages to determine average MI at each bit size and determine a second curve. Additional curves may be generated that present the same data as MI/bit size.

At block 1130, a selected bit size may be determined. For example, the controller or tester may use the curves determined at blocks 1126 and 1128 to identify the bit size that maximizes the MI per bit size to determine an optimal bit size and corresponding mutual information value.

At block 1132, an ECC code rate may be determined. For example, based on the selected bit size and tradeoffs between modulation code and error correction code rate, the controller or tester may select a code rate for the ECC to maximize mutual information.

At block 1134, a modulation code may be determined. For example, a mutual information target and acceptable modulation code penalty may be determined from the dependency between the ECC redundancy and modulation code redundancy and the controller or tester may use those modulation code parameters to evaluate and select the modulation code for use in the configuration settings.

In some configurations, blocks 1136-1146 describe an example process for determining dependencies between ECC and modulation code using mutual information. At block 1136, mutual information for bits across a sector may be determined and categorized. For example, the controller or tester may use the mutual information calculations from the known pattern to aggregate mutual information values for different categories of bit usage/quality.

At block 1138, a number of bad bits may be determined. For example, the controller or tester may aggregate the mutual information for bits identified as having negative (<0) mutual information based on the symbol context mutual information.

At block 1140, a number of good bits may be determined. For example, the controller or tester may aggregate mutual information for bits identified as having at least zero (>=0) based on the comparison on the symbol context mutual information.

At block 1142, a number of ECC redundancy bits may be determined. For example, based on a candidate code rate, the controller or tester may determine the corresponding number of redundancy bits needed.

At block 1144, a number of modulation code redundancy bits may be determined. For example, based on a candidate modulation code, the controller or tester may determine the corresponding number of redundancy bits corresponding to the modulation code penalty.

At block 1146, dependency between ECC and modulation code may be determined. For example, the controller or tester may apply the calculations described for FIG. 5B to determining the tradeoffs between modulation code and ECC code rate, including what ECC code rate is optimal for the selected bit size and when the modulation code rate penalty is worth a loss in ECC code rate.

In some configurations, blocks 1148-1156 describe an example process for evaluating modulation codes for improving mutual information (given the tradeoffs determined at blocks 1136-1146). At block 1148, one or more candidate modulation codes may be determined. For example, the controller or processor may select a modulation code most likely to achieve the optimal goal of eliminating symbol contexts with negative mutual information.

At block 1150, the codeword for the modulation code may be divided into symbols. For example, the controller or tester may divide the modulation code into a number of symbols equal the length of the codeword divided by the multi-bit symbol length.

At block 1152, symbol context mutual information may be determined for the symbols. For example, the controller or tester may use the symbol context mutual information determined at block 1118 for the relevant symbol contexts.

At block 1154, average mutual information for the sector using the modulation code or codes may be determined. For example, the controller or tester may average the symbol context mutual information for the modulation code symbols across the sector data. The average mutual information without any modulation code may also be determined (from block 1120).

At block 1156, average mutual information values may be compared to select the modulation code from one or more candidate modulation codes. For example, the controller or tester may compare sector average MI for each candidate modulation code and no modulation code to select the modulation code that has the highest average mutual information, or, if no modulation code has the highest mutual information, then no modulation code may be selected.

Figure 12:
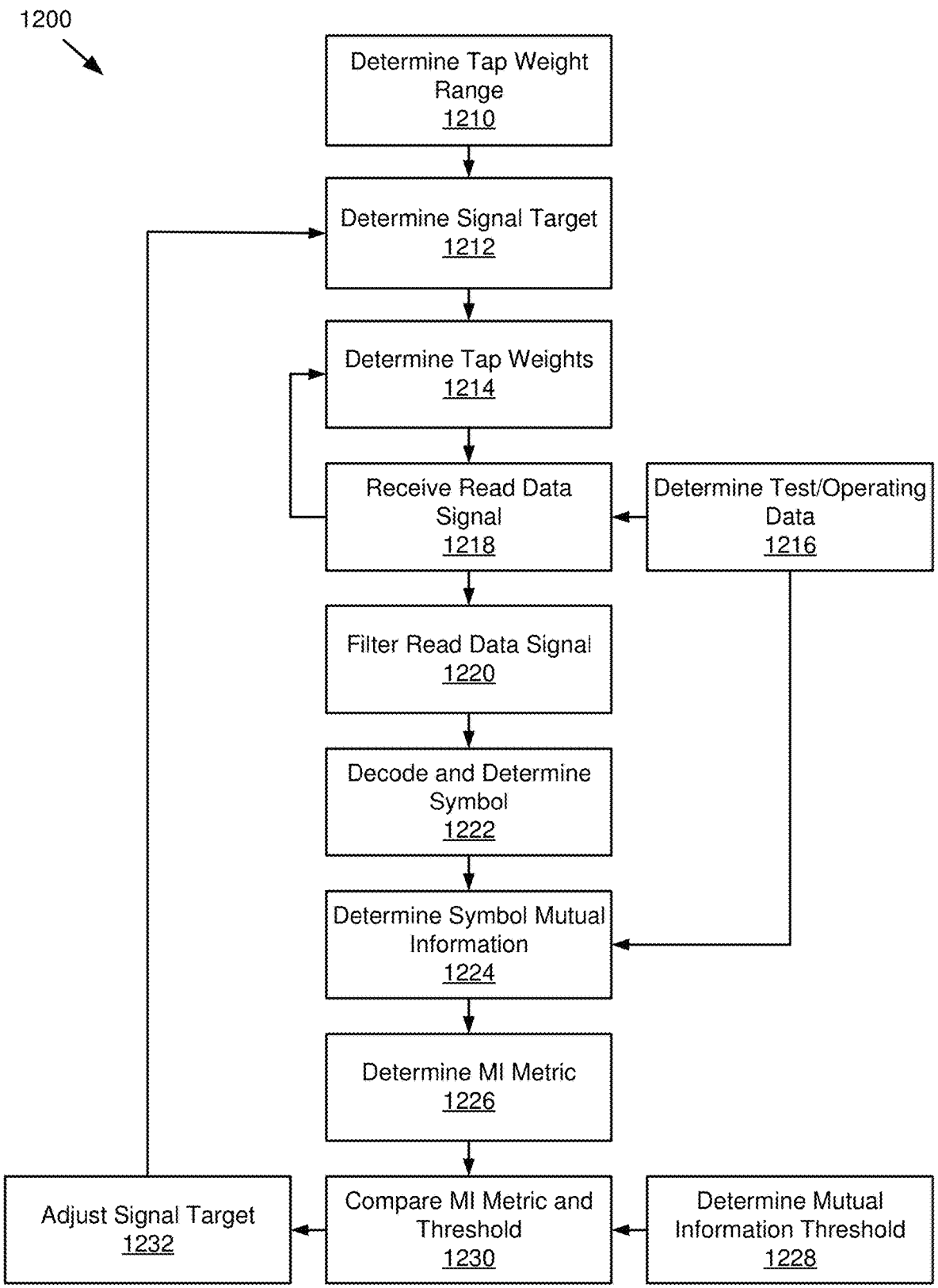
FIG. 12 is an example method of determining signal processing settings based on mutual information metrics.

As shown in FIG. 12, control circuitry 300 and/or test system 400 may be operated according to an example method of determining signal processing settings based on mutual information metrics, i.e., according to the method 1200 illustrated by blocks 1210-1232.

At block 1210, a tap weight range for one or more signal processing filters may be determined. For example, the controller or tester may be configured with tap weight range values for each tap and/or corresponding filter based on the specifications of those filters and/or a previously determined operating range for those filters.

At block 1212, a signal target may be determined. For example, the controller or tester may determine an ideal signal value or pattern based on known input signals, default target values, and/or prior iterations of method 1200.

At block 1214, the tap weights may be determined. For example, the signal processing components may include logic for iteratively adjusting tap weights to optimize filter performance against the signal target and may use a feedback loop to iteratively adjust tap weights within their ranges to move closer to the signal target.

At block 1216, test or operating data may be determined. For example, the tester or controller may be configured with test data having a known set of bits to be written to and read from the storage medium of the data storage device and/or the operating data storage device may use previously read and successfully decoded data for adapting filter performance during the operating life of the data storage device.

At block 1218, previously written data may be read from the storage medium as a read data signal. For example, the data storage device may read encoded test data or encoded user data from the storage medium using the read channel from the read transducer of the read/write head to generate an analog read data signal.

At block 1220, the read data signal may be filtered using the filter tap weights. For example, the analog front end and/or one or more other data processing components in the read path of the channel may filter the analog and/or digital read data signal for equalization, noise filtering, etc.

At block 1222, a symbol may be decoded and determined. For example, the read channel may process the filtered digital read data signal through the channel detectors and decoders to determine bit values and divide the read data signal from the read operation into multi-bit symbols for mutual information calculation.

At block 1224, symbol mutual information may be determined. For example, the controller or tester may use the LLR values from the read operation at blocks 1218-1222 and known LLR values based on the test data to calculate mutual information values for each symbol.

At block 1226, mutual information metrics may be determined for the read data. For example, the symbol mutual information values for the set of symbols corresponding to the read operation may be aggregated to determine a mutual information metric for that read operation.

At block 1228, a mutual information threshold may be determined for evaluation of the mutual information metrics. For example, a mutual information threshold may be defined for acceptable signal processing performance as a component of overall read channel performance and/or the mutual information metric of a prior signal target and resulting configuration of tap weights may be used as a threshold for determining whether the signal target and/or tap weights being tested results in a higher mutual information metric.

At block 1230, the mutual information metric may be compared to the mutual information threshold. For example, the controller or tester may evaluate the signal processing settings being tested against a baseline mutual information threshold and/or the mutual information metrics achieved by other signal processing settings for the data storage device. The outcome of these comparisons may include adjusting the signal target for additional test iterations at block 1232 or selecting the signal target and/or set of tap weights with the highest mutual information metric for production use and setting the signal processing settings of the data storage device.

At block 1232, the signal target may be adjusted for additional test iterations. For example, analysis of the prior mutual information metrics may suggest a next signal target to try (e.g., signal pattern corresponding to known input pattern). In some configurations, a range of signal targets may be defined and a sweep algorithm may be used for determining the signal target to test in each iteration.

Technology for improved optimization of data storage devices based on mutual information metrics is described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to particular hardware.

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, compact disk read-only memories (CD-ROMs), and magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

The disclosed technologies can take the form of an entire hardware implementation, an entire software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A system, comprising:
   at least one memory; and
   at least one processor configured to:
   determine a known pattern for a data frame;
   determine a series of symbol contexts comprising different bit sequences for a selected multi-bit symbol length;
   determine a mutual information value for each symbol context in the series of symbol contexts;
   determine, based on variations in the mutual information values for the series of symbol contexts in the data frame, a set of configuration settings for a channel circuit of a data storage device; and store the set of configuration settings to the data storage device for use in operating the channel circuit.

2. The system of claim 1, wherein:
the data frame is a codeword for encoding and decoding data stored to the data storage device using the channel circuit; and
determining the set of configuration settings comprises averaging the mutual information values for the series of symbol contexts in the codeword to evaluate use of the codeword in the set of configuration settings.

3. The system of claim 1, wherein the at least one processor is further configured to determine the set of configuration settings by:
determining a range of bit sizes corresponding to a combination of bits per inch and tracks per inch on a non-volatile storage medium of the data storage device; and
determining the mutual information values for the series of symbol contexts on the data frame for a plurality of bit sizes in the range of bit sizes.

4. The system of claim 3, wherein:
the at least one processor is further configured to determine the set of configuration settings by:
determining, based on the mutual information values for the series of symbol contexts and unmodulated data, first average mutual information values by bit size for the range of bit sizes;
determining, based on the mutual information values for the series of symbol contexts and optimally modulated data, second average mutual information values by bit size for the range of bit sizes; and
determining, based on comparing the first average mutual information values and the second average mutual information values, a selected bit size from the range of bit sizes; and
a bit per inch value and a track per inch value corresponding to the selected bit size are in the set of configuration settings.

5. The system of claim 4, wherein:
the selected bit size and a corresponding mutual information value determine a target mutual information value for determining an error correction code rate and a modulation code;
the at least one processor is further configured to determine the set of configuration settings by:
determining, based on the target mutual information value, a selected error correction code rate; and
determining, based on the target mutual information value and the selected error correction code rate, a selected modulation code; and
the selected error correction code rate and the selected modulation code are in the set of configurations settings.

6. The system of claim 1, wherein:
the at least one processor is further configured to determine the set of configuration settings by:
determining mutual information for bits across the data frame;
determining a mutual information dependency between error correction codes and modulation codes for the data frame based on mutual information for:
a number of bits having negative mutual information;
a number of bits having at least zero mutual information;
a number of error correction code redundancy bits for a candidate error correction code; and
a number of modulation code redundancy bits for a candidate modulation code;
determining a selected error correction code rate; and
determining, based on the selected error correction code rate and the mutual information dependency between error correction codes and modulation codes, a selected modulation code; and
the selected error correction code rate and the selected modulation code are in the set of configurations settings.

7. The system of claim 1, wherein:
the at least one processor is further configured to determine the set of configuration settings by:
determining at least one modulation code;
dividing a codeword for the at least one modulation code into multi-bit symbols;
determining the mutual information values for symbol contexts corresponding to the multi-bit symbols of the codeword;
determining an average mutual information value for the data frame based on the mutual information values for the codeword; and
determining, based on average mutual information values for the at least one modulation code and no modulation code, a selected modulation code from the at least one modulation code; and
the selected modulation code is in the set of configuration settings.

8. The system of claim 7, wherein:
the at least one modulation code comprises a plurality of modulation codes;
determining the selected modulation code comprises comparing average mutual information values for each modulation code of the plurality of modulation codes and an average mutual information value for no modulation code;
if the mutual information value for at least one symbol context is negative, the selected modulation code eliminates the at the least one symbol context; and
if the mutual information value for each symbol context is at least zero, the selected modulation code is no modulation code.

9. The system of claim 1, further comprising:
a tester comprising:
the at least one memory;
the at least one processor; and
a storage device interface configured to communicate with the data storage device to:
write the known pattern to the data frame on a non-volatile storage medium of the data storage device;
read the known pattern from the data frame on the non-volatile storage medium; and
store the set of configuration settings to the data storage device for use in operating the channel circuit.

10. The system of claim 1, further comprising:
the data storage device comprising:
the at least one memory;
the at least one processor;
a non-volatile storage medium configured to store user data; and
the channel circuit configured to encode user data and decode user data from the non-volatile storage medium using the set of configuration settings.

11. A method comprising:
   determining a known pattern for a data frame written to a non-volatile storage medium of a data storage device;
   determining a series of symbol contexts comprising different bit sequences for a selected multi-bit symbol length;
   determining a mutual information value for each symbol context in the series of symbol contexts; and
   determining, based on the mutual information values for the series of symbol contexts in the data frame, a set of configuration settings for a channel circuit of a data storage device; and
   storing the set of configuration settings to the data storage device for use in operating the channel circuit.

12. The method of claim 11, wherein:
   the data frame is a codeword for encoding and decoding data stored to the data storage device using the channel circuit; and
   determining the set of configuration settings comprises averaging the mutual information values for the series of symbol contexts in the codeword to evaluate use of the codeword in the set of configuration settings.

13. The method of claim 11, wherein determining the set of configuration settings further comprises:
   determining a range of bit sizes corresponding to a combination of bits per inch and tracks per inch on a non-volatile storage medium of the data storage device; and
   determining the mutual information values for the series of symbol contexts on the data frame for a plurality of bit sizes in the range of bit sizes.

14. The method of claim 13, wherein:
   determining the set of configuration settings further comprises:
      determining, based on the mutual information values for the series of symbol contexts and unmodulated data, first average mutual information values by bit size for the range of bit sizes;
      determining, based on the mutual information values for the series of symbol contexts and optimally modulated data, second average mutual information values by bit size for the range of bit sizes; and
      determining, based on comparing the first average mutual information values and the second average mutual information values, a selected bit size from the range of bit sizes; and
   a bit per inch value and a track per inch value corresponding to the selected bit size are in the set of configuration settings.

15. The method of claim 14, wherein:
   the selected bit size and a corresponding mutual information value determine a target mutual information value for determining an error correction code rate and a modulation code;
   determining the set of configuration settings further comprises:
      determining, based on the target mutual information value, a selected error correction code rate; and
      determining, based on the target mutual information value and the selected error correction code rate, a selected modulation code; and
   the selected error correction code rate and the selected modulation code are in the set of configurations settings.

16. The method of claim 11, wherein:
   determining the set of configuration settings further comprises:
      determining mutual information for bits across the data frame;
      determining a mutual information dependency between error correction codes and modulation codes for the data frame based on mutual information for:
         a number of bits having negative mutual information;
         a number of bits having at least zero mutual information;
         a number of error correction code redundancy bits for a candidate error correction code; and
         a number of modulation code redundancy bits for a candidate modulation code;
      determining a selected error correction code rate; and
      determining, based on the selected error correction code rate and the mutual information dependency between error correction codes and modulation codes, a selected modulation code; and
   the selected error correction code rate and the selected modulation code are in the set of configurations settings.

17. The method of claim 11, wherein:
   determining the set of configuration settings further comprises:
      determining at least one modulation code;
      dividing a codeword for the at least one modulation code into multi-bit symbols;
      determining the mutual information values for symbol contexts corresponding to the multi-bit symbols of the codeword;
      determining an average mutual information value for the data frame based on the mutual information values for the codeword; and
      determining, based on average mutual information values for the at least one modulation code and no modulation code, a selected modulation code from the at least one modulation code; and
   the selected modulation code is in the set of configuration settings.

18. The method of claim 17, wherein:
   the at least one modulation code comprises a plurality of modulation codes;
   determining the selected modulation code comprises comparing average mutual information values for each modulation code of the plurality of modulation codes and an average mutual information value for no modulation code;
   if the mutual information value for at least one symbol context is negative, the selected modulation code eliminates the at the least one symbol context; and
   if the mutual information value for each symbol context is at least zero, the selected modulation code is no modulation code.

19. The method of claim 11, further comprising, prior to determining the set of configuration settings:
   writing the known pattern to the data frame on the non-volatile storage medium of the data storage device; and
   reading the known pattern from the data frame on the non-volatile storage medium.

20. A system comprising:
   at least one processor;
   at least one memory;
   means for determining a known pattern for a data frame written to a non-volatile storage medium of a data storage device;

means for determining a series of symbol contexts comprising different bit sequences for a selected multi-bit symbol length;
means for determining a mutual information value for each symbol context in the series of symbol contexts; and
means for determining, based on the mutual information values for the series of symbol contexts in the data frame, a set of configuration settings for a channel circuit of a data storage device; and
means for storing the set of configuration settings to the data storage device for use in operating the channel circuit.

\* \* \* \* \*